United States Patent
Zhong et al.

(10) Patent No.: US 12,449,798 B2
(45) Date of Patent: Oct. 21, 2025

(54) STPA METHOD AND DEVICE FOR ACCURATE IDENTIFICATION OF LOSS SCENARIOS

(71) Applicant: BEIHANG UNIVERSITY, Beijing (CN)

(72) Inventors: Deming Zhong, Beijing (CN); Rui Sun, Beijing (CN); Rui Guo, Beijing (CN); Haoyuan Gong, Beijing (CN); Yun Zha, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 400 days.

(21) Appl. No.: 18/021,598

(22) PCT Filed: Aug. 9, 2021

(86) PCT No.: PCT/CN2021/111488
§ 371 (c)(1),
(2) Date: Feb. 16, 2023

(87) PCT Pub. No.: WO2022/037430
PCT Pub. Date: Feb. 24, 2022

(65) Prior Publication Data
US 2023/0305550 A1      Sep. 28, 2023

(30) Foreign Application Priority Data
Aug. 17, 2020   (CN) .......................... 202010828296.1

(51) Int. Cl.
G05B 23/02        (2006.01)
(52) U.S. Cl.
CPC ..... G05B 23/0243 (2013.01); G05B 23/0235 (2013.01); G05B 23/0275 (2013.01)

(58) Field of Classification Search
CPC ............ G05B 23/0243; G05B 23/0235; G05B 23/0275; G05B 2219/24065; G05B 9/03;
(Continued)

(56) References Cited

U.S. PATENT DOCUMENTS

| | | | | |
|---|---|---|---|---|
| 2003/0018461 A1* | 1/2003 | Beer | ................... | G06F 30/3323 703/14 |
| 2008/0128562 A1* | 6/2008 | Kumar | ................ | B61L 15/0081 246/186 |

(Continued)

FOREIGN PATENT DOCUMENTS

| | | | | |
|---|---|---|---|---|
| CN | 107220539 A | * | 9/2017 | ............. G06F 21/53 |
| CN | 108376221 A | | 8/2018 | |

(Continued)

OTHER PUBLICATIONS

"Asim Abdulkhaleq, A comprehensive safety engineering approach for software intensive systems based on STPA, 2015, Science Direct" (Year: 2015).*

(Continued)

*Primary Examiner* — Santosh R Poudel
(74) *Attorney, Agent, or Firm* — Tucker Ellis LLP

(57) ABSTRACT

The present invention provides an STPA method and apparatus for accurate identification of a loss scenario. The method comprises: defining the purpose of the analysis, comprising identifying of a loss; modeling a system state machine using a finite state machine; identifying an unsafe control action using the identified loss and the modeled system state machine. The method according to the present invention achieves accurate and efficient identification of loss scenarios of a complex system using state machines and model checking techniques.

13 Claims, 15 Drawing Sheets

(58) Field of Classification Search
CPC ...... G06F 30/20; G06F 2119/02; G06F 30/15; G06F 30/23; B64F 5/00
See application file for complete search history.

(56) References Cited

U.S. PATENT DOCUMENTS

| | | | |
|---|---|---|---|
| 2013/0212054 A1* | 8/2013 | Shankar | G06F 9/4498 706/45 |
| 2017/0308424 A1* | 10/2017 | Gossler | G06F 11/079 |
| 2021/0374637 A1* | 12/2021 | Hunt | G06Q 10/0633 |

FOREIGN PATENT DOCUMENTS

| | | |
|---|---|---|
| CN | 108398940 A | 8/2018 |
| CN | 110008607 A | 7/2019 |
| WO | 2018074647 A1 | 4/2018 |

OTHER PUBLICATIONS

"STPA: A Systems Approach to Process Hazard Analysis, Gate Energy, https://www.gate.energy/the-brainery/stpa" (Year: 2025).*
International Search Report from corresponding International Application No. PCT/CN2021/111488, mailed on Nov. 10, 2021, 4 pages.

* cited by examiner

STPA METHOD AND DEVICE FOR ACCURATE IDENTIFICATION OF LOSS SCENARIOS

TECHNOLOGY FIELD

The present invention relates to the field of system safety analysis, and in particular to an STPA method and apparatus for accurate identification of loss scenarios. The invention is particularly suitable for the safety analysis of complex engineering systems such as transportation, aviation, aerospace, nuclear power, for example.

BACKGROUND TECHNOLOGY

Accurate and efficient safety analysis of systems has been the direction of research in the engineering system safety analysis industry. Especially with the rapid development of large systems and complex systems such as traffic, transportation, marine transportation, aerospace and other fields, the efficient and accurate safety analysis and diagnosis of such large and complex systems has become an urgent research and solution issue.

In the past, conventional safety theory considered that physical failure of a system was the only indicator of system safety, and that physical failure, i.e., an accident, was caused by a directly related chain of events that could be analyzed to figure out the accident and assess the risk by analyzing the chain of events that led to the loss. Therefore, previous research methods and concerns have mostly focused on the transmission of event chains, where accidents do not occur if the components or the system does not fail, and safety is enhanced as the reliability of the system or the components increases. Therefore, probabilistic risk analysis based on event chains is the conventional and best way to assess and express safety and risk information prior to the present invention.

However, as systems became more complex, doubts about the previous theory grew stronger. In particular, in 2004, Professor Nancy G. Leveson of MIT proposed "System-Theoretic Accident Models and Processes" (STAMP), this theory considers that the safety of a system is the emergent characteristics of the system, i.e., the system structure and the system environment and their interrelationships, determine the system integrity and functions. According to this theory, system integrity and functions are the result of the integration of the internal system structure and the external system environment, which is also called Emergence in complexity research. Emergence is the process of generating new functions and structure, the process of generating new qualities, and this process is the product of the system structure and the system environment and the interaction therebetween. Emergence comes from the idea of "the whole is greater than the sum of its parts" in systems theory. Emergent properties are the properties that emerge from the interactions of system components. The control method for the emergent properties is to constrain the system's component behaviors and component interactions, that is, the system's safety state is maintained or enhanced by imposing safety constraints on component behaviors and interactions between components. Unlike the traditional accident causation model that considers accidents to be caused by component failure, STAMP theory considers accidents to be caused by inappropriate control. Based on this, Professor Leveson proposed the System-Theoretic Process Analysis (STPA) based on the hazard analysis approach of STAMP theory. Currently, some standards on STPA are being developed, for example, SAE (Society of Automotive Engineers) is developing "SAE AIR6913-Using STPA during Development and Safety Assessment of Civil Aircraft", "SAE J3187-Applying System Theoretic Process Analysis (STPA) to Automotive Applications"; China is also developing a national standard "System Theoretic Process Analysis (STPA) Method".

In March 2018, Nancy G. Leveson and John P Thomas released the "STPA Handbook", which is the main document for current international STPA standard development, industrial application, academic research, and methodological improvement reference. STPA in the "STPA Handbook", consists of four main working steps, which are.

Step 1: To define the purpose of the analysis

This includes work on identify losses, identify system-level hazards, identify system-level safety constraints, and refine hazards.

Step 2: To model the hierarchical control structure

The modeled hierarchical control structure comprises controllers, controlled process, control actions, feedbacks, and inputs and outputs between other components. Where a controller includes a control algorithm and a process model.

Step 3: To identify Unsafe Control Actions using the control structure model Unsafe Control Action (UCA) is a control action that causes a hazard in a specific context and worst-case scenario. An Unsafe Control Action is a combination of Source, UCA Type, Control Action (CA), Context, and Link to Hazards. Source is the controller that provides the control actions. Type is the type of UCA, including provided, not provided, too early or too late, stop too early or last too long, a total of four categories. Control Action refers to the control action issued by a controller. Associated Hazard refers to the hazard (or sub-hazard) that may result from this UCA.

In the UCA identification process, a combination of Source, UCA Type, Control Action (CA) and Context is first generated, and then it is determined whether the combination leads to an identified hazard, or whether it is a new hazard.

Step 4: To identify loss scenarios

Loss scenarios describe the causal factors that can lead to UCA and hazards.

Two types of loss scenarios are considered here: 1) Why does an unsafe control action occur? 2) Why does the control action appear to be performed unfavorably or not performed, resulting in a hazard?

For the first type of scenarios, loss scenarios associated with physical failure of the controller, inadequate control algorithms, inadequate control inputs, inadequate process models, etc should be considered;

For the second category of scenarios, loss scenarios related to factors such as feedback or information not received, receipt of inadequate feedback information, etc. should be considered.

The STPA method is particularly suitable for safety analysis of complex engineering systems. At present, STPA method has been widely used in complex engineering systems such as transportation, aerospace, aviation and nuclear power.

However, the existing STPA approach also has outstanding problems, mainly in the following areas.

1. Modeling of Hierarchical System Control Structure Model Using Custom Methods

This approach, although simple in modeling, is not conducive to integrating STPA analysis work with existing systems engineering. In industry, systems are mainly modeled using languages such as SysML, AADL, and AltaRica.

If the model is modeled according to the requirements of the "STPA Handbook", it means that the system model needs to be remodeled, which will not only increase the workload, but more importantly, remodeling the system model may bring semantic changes, resulting in affecting the reliability of STPA analysis.

In addition, the modeling approach provided by the "STPA Handbook" only reflects the static input and output relationships between components and lacks description of the dynamic behavior between components, and thus does not have the ability to support the identification of loss scenarios in the dynamic emergent behavior of the system.

2. Problems with Identification of Loss Scenarios

A. Identification of Loss Scenarios by Manual Approach

STAMP considers hazard as an emergent property, a state that emerges from the interaction of system components. The STPA method in the "STPA Handbook", on the other hand, uses manual analysis to identify loss scenarios during loss scenario identification. When the system is large in size and has many interaction behaviors, it is difficult to identify loss scenarios by manual approach.

B. Finding and Identifying Loss Scenarios in Local Components

According to the STPA methodology in the "STPA Handbook", loss scenarios identification is divided into two types. The first type focuses on how the controllers and sensors form the loss scenarios, and the second type focuses on how the actuators and the controlled process form the loss scenarios. Both types of lossy scenarios identification identify loss scenarios in the interaction of local components. However, this contradicts the STAMP theory on which the method is based. STAMP theory considers hazards as a result of interactive emergencies of system components, while the STPA method in the "STPA Handbook" disconnects system components in identification of loss scenarios. This makes it difficult to identify some hazard scenarios that involve the interaction of all system components.

3. The UCA Concepts Used in Scenario Identification are Misplaced

A. Use UCA as the Output of Controllers

On the one hand, the "STPA Handbook" recognizes UCA as a hazard, i.e. a system state. The STPA considers UCA as a combination of the following elements: Source, UCA Type, Control Action, Contex. According to this definition, UCA does not exist at the output of controllers. However, the "STPA Handbook" considers the UCA as the output of controllers when performing the first type of scenario identification (see FIG. 2.18 in the "STPA Handbook"). This can lead to inaccuracies in the analysis process.

B. CA is Incorrectly Defined

According to the "STPA Handbook", it defines CA here as CA issued by controllers. UCA is the system hazard, and the hazard is directly related to the controlled process, so the CA included in UCA should refer to the control action received by the controlled process, not the CA issued by the controllers. Only CA-PR that acts directly on the controlled process is more helpful to clearly determine whether the controlled process is hazardous.

In identifying a UCA, the CA-PR received by the controlled process is also the CA issued by the controller because actuators and sensors are not included in the hierarchical control structure, so the problem of incorrectly defined CA in the "STPA Handbook" is not exposed at this time.

However, when the identification of loss scenarios is performed according to the "STPA Handbook", the CA output from the controllers is not the CA-PR accepted by the controlled process because the used hierarchical control structure adds actuators and sensors, and the actuators may bring changes or delays to the signal transmission. The CA output from the controllers and the CA-PR received by the controlled process are the actuator input and the actuator output, respectively. The actuator itself may make a difference between the two.

The work of identification of loss scenarios requires identifying the occurrence scenarios of UCA, the constituent element of UCA at this time should be the control actions received by the controlled process, not the CA issued by the controllers. The STPA method in the "STPA Handbook", when identifying the loss scenarios, mistakenly treats the CA output by the controllers as the constituent element of UCA, which leads to confusion in its UCA scenarios identification work.

Based on the above reasons, the system safety analysis using the traditional STPA method has the problems of inaccurate, inefficient and even incorrect identification of loss scenarios.

DESCRIPTION OF INVENTION

In view of this, the present invention aims to solve the above problems and provides an STPA method and device for accurate identification of loss scenarios.

An STPA method for accurate identification of a loss scenario according to the present invention comprises:
defining the purpose of the analysis, comprising identifying of a loss;
modeling a system control structure using a state mechanism and modeling a system state machine;
identifying an unsafe control action using the identified loss and the modeled system state machine;
identifying the loss scenario using model checking techniques and the identified unsafe control action.

According to a preferred embodiment, the system state machine comprises a controller state machine, a controlled process state machine, and an interaction between the controller state machine and the controlled process state machine.

According to a preferred embodiment, the system state machine comprises all behaviors of the controller, all behaviors of the controlled process, and all interactive behaviors between the controller and the controlled process, that are required for identifying the unsafe control action.

According to a preferred embodiment, the unsafe control action is a combination of a control action, a type, and a context.

According to a preferred embodiment, the unsafe control action comprises a time-independent unsafe control action and a time-dependent unsafe control action, types of the time-independent unsafe control action comprise: not providing control action and providing control action; types of the time-dependent unsafe control action comprise: providing a control action too early, too late or in a wrong order, a control action lasting too long or ending too quickly.

According to a preferred embodiment, the control action is a control action received by the controlled process and the unsafe control action is a system level hazard.

According to a preferred embodiment, identifying an unsafe control action using the identified loss and the modeled system state machine comprises:
determining a control action and a context, using the system state machine;

identifying an instance of a combination of the control action, the context and the type, based on the control action and the context;
identifying the unsafe control action according to the instance.

According to a preferred embodiment, identifying a loss scenario using model checking techniques and the identified unsafe control action comprises:
updating the system state machine, the updated system state machine comprising a controller state machine, a controlled process state machine, a sensor state machine, an actuator state machine, and an interaction thereof
modeling a model checking model using the updated system state machine.
identifying a loss scenario using the unsafe control action and the model checking model.

According to a preferred embodiment, the updated system state machine comprises all behaviors of the controller, all behaviors of the controlled process, all behaviors of the sensor, all behaviors of the actuator, and all behaviors of the interaction of the controller, the controlled process, the sensor, and the actuator, that are required for identifying the loss scenario.

According to a preferred embodiment, the system state machine is modeled using SysML, AADL or AltaRica, and the model checking model is modeled using NuSMV or UPPAAL.

According to a preferred embodiment, the system state machine comprises time information.

According to a preferred embodiment, the time information is described by a MARTE element.

According to a preferred embodiment, the model checking model is modeled using NuSMV, wherein the time information is described by constructing a clock variable.

According to a preferred embodiment, identifying a loss scenario using the unsafe control action and model checking model comprises:
determining a system safety constraint based on the unsafe control action;
describing the system safety constraint using a model checking logic language to form a property to be checked;
performing model checking for the property to be checked using the model checking model to identify the loss scenario.

According to a preferred embodiment, the unsafe control action comprises a time-independent unsafe control action and a time-dependent unsafe control action, the time-dependent unsafe control action comprising time information that is too early, too late, in a wrong order, lasting too long, or ending too quickly, the time information being expressed by a clock variable in the model checking model.

According to a preferred embodiment, the property to be checked is described using logic language TCTL, CTL, LTL or RTCTL.

The present invention also provides an STPA device for accurate identification of a loss scenario, comprising.
an analysis purpose defining unit, for determining the purpose, comprising identifying a loss;
a state machine modeling unit for modeling a system control structure using a state mechanism and modeling a system state machine;
an unsafe action identification unit for identifying an unsafe control action using the identified loss and the modeled system state machine;
a loss scenario identification unit for identifying the loss scenario using model checking techniques and the identified unsafe control action.

According to a preferred embodiment, the system state machine comprises a controller state machine, a controlled process state machine, and an interaction between the controller state machine and the controlled process state machine.

According to a preferred embodiment, the system state machine comprises all behaviors of the controller, all behaviors of the controlled process, and all interactive behaviors between the controller and the controlled process, that are required for identifying the unsafe control action.

According to a preferred embodiment, the unsafe control action is a combination of a control action, a type, and a context.

According to a preferred embodiment, the unsafe control action comprises a time-independent unsafe control action and a time-dependent unsafe control action, types of the time-independent unsafe control action comprise: not providing control action and providing control action; types of the time-dependent unsafe control action comprise: providing a control action too early, too late or in a wrong order, a control action lasting too long or ending too quickly.

According to a preferred embodiment, the control action is a control action received by the controlled process and the unsafe control action is a system level hazard.

According to a preferred embodiment, the unsafe control action identification unit is configured for:
determining a control action and a context, using the system state machine;
identifying an instance of a combination of the control action, the context and the type, based on the control action and the context;
identifying the unsafe control action according to the instance.

According to a preferred embodiment, the loss scenario identification unit is configured for:
updating the system state machine, the updated system state machine comprising a controller state machine, a controlled process state machine, a sensor state machine, an actuator state machine, and an interaction thereof
modeling a model checking model using the updated system state machine.
identifying a loss scenario using the unsafe control action and the model checking model.

According to a preferred embodiment, the updated system state machine comprises all behaviors of the controller, all behaviors of the controlled process, all behaviors of the sensor, all behaviors of the actuator, and all behaviors of the interaction of the controller, the controlled process, the sensor, and the actuator, that are required for identifying the loss scenario.

According to a preferred embodiment, the system state machine is modeled using SysML, AADL or AltaRica, and the model checking model is modeled using NuSMV or UPPAAL.

According to a preferred embodiment, the system state machine comprises time information.

According to a preferred embodiment, the time information is described by a MARTE element.

According to a preferred embodiment, the model checking model is modeled using NuSMV, wherein the time information is described by constructing a clock variable.

According to a preferred embodiment, identifying a loss scenario using an unsafe control action and a model checking model comprises:
- determining a system safety constraint based on the unsafe control action;
- describing the system safety constraint using a model checking logic language to form a property to be checked;
- performing model checking for the property to be checked using the model checking model to identify the loss scenario.

According to a preferred embodiment, the unsafe control action comprises a time-independent unsafe control action and a time-dependent unsafe control action, the time-dependent unsafe control action comprising time information that is too early, too late, in a wrong order, lasting too long, or ending too quickly, the time information being expressed by a clock variable in the model checking model.

According to a preferred embodiment, the property to be checked is described using logic language TCTL, CTL, LTL or RTCTL.

The present invention also provides a storage medium comprising computer-executable instructions, the computer-executable instructions being used to implement the method described above when executed by a processor.

According to the technical solution of the present invention, it is simpler to use and can reuse existing system models due to the use of state machine modeling; it can automate the identification of a loss scenario due to the use of model checking techniques; it makes the analysis more adequate due to the consideration of emergent hazard scenarios in the complete interaction behavior of the controller, controlled process, sensors, and actuators; in addition, since the definition of UCA uses the actual control actions accepted by the controlled process, combined with the use of state machine and model checking techniques, it can make the architecture of STPA more clear. Therefore, the technical solution of the present invention can achieve accurate and efficient identification of a loss scenario of complex systems, enhance the accuracy of identification, and improve the efficiency of identification of a loss scenario at the same time.

EMBODIMENTS

In order to make the purpose, the technical solution and advantages of the invention clearer, the invention is described in detail below with reference to drawings and specific embodiments.

Figure 1:
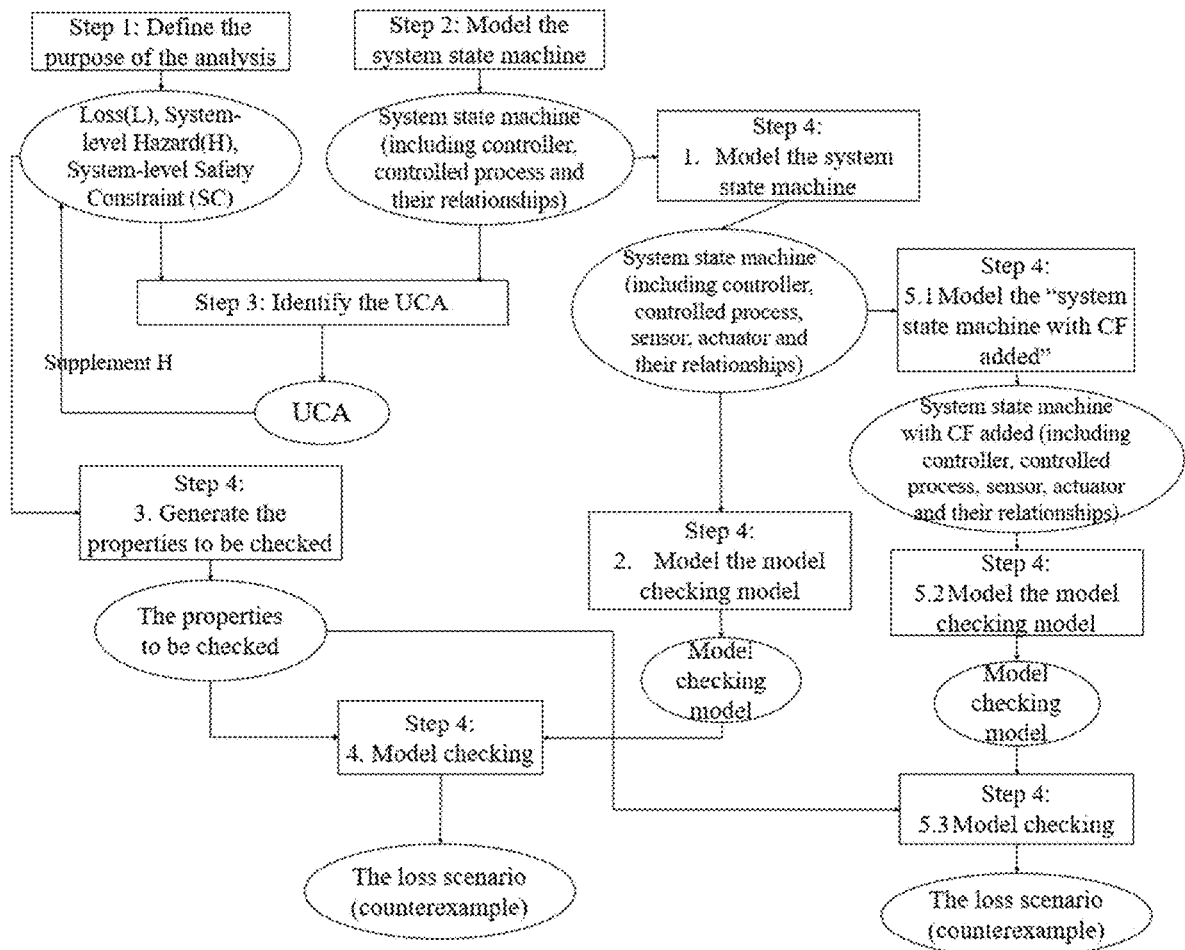
FIG. 1 shows a flow chart of a loss scenario identification method according to an embodiment of the present invention.

The loss scenario identification method according to an embodiment of the present invention is described in detail below with reference to FIG. 1.

The loss scenario identification method according to an embodiment of the present invention comprises four major steps.

Step 1: To Define the Purpose of the Analysis

Similar to the first step of the STPA method in the prior art, the first step in embodiments of the present invention focuses on defining the purpose of the analysis, including identifying losses. According to a preferred embodiment, defining the analysis purpose may also include identifying system-level hazards, identifying system-level safety constraints, and identifying refine hazards.

At a minimum, the loss needs to be identified in the first step. The identified losses enable the identification of unsafe control actions in subsequent steps. Losses involve something of value to stakeholders. Losses may include loss of life or personal injury, property damage, environmental contamination, mission failure, loss or disclosure of sensitive information, or other losses that are unacceptable to the stakeholders.

In the first step, purposes such as system-level hazards, system-level safety constraints, and refined hazards can also be identified to reduce the workload of subsequent steps.

In the context of the present invention, a system is a set of components that act together to achieve a common goal. A system may include multiple subsystems or may be a component of a larger system. A hazard is a system state or set of conditions that will result in a loss under specific worst-case environmental conditions. System-level safety constraints specify the system conditions or behaviors that need to be met to prevent a hazard (and ultimately prevent a loss). The "STPA Handbook" provides specific explanations of system-level hazards and system-level safety constraints on pages 17 and 20, respectively.

A refined hazard is a system-level hazard that is broken down into several sub-hazards. For example, if "the aircraft is too close to other objects on the ground", a sub-hazard of that hazard is: "the aircraft accelerates too much during taxiing". Page 21 of the "STPA Handbook" provides a specific explanation of refined hazards.

Step 2: To Model the System State Machine

An improvement of the present invention is to use a system state machine instead of the hierarchical control structure model in the conventional STPA approach. In the second step, the system state machine is modeled by a finite state mechanism.

The hierarchical control structure model is described and adopted in the "STPA Handbook" released by Nancy Leveson and John Thomas of MIT in 2018. A hierarchical control structure is a model of a system consisting of feedback control loops. An effective control structure will impose constraints on the behavior of the entire system. The control structure includes inputs and outputs from the controller, control actions, feedback, control actions, controlled processes, and other pieces. Actuators and sensors are also typically added to the hierarchical control structure when performing a loss scenario identification. The controller provides control actions to control the process and imposes constraints on the behavior of the controlled process. The controller includes a control algorithm and a process model. The control algorithm represents the controller's decision process, which determines the control actions to be provided. The process model is the controller's knowledge of the controlled process and other relevant aspects of the system or environment, which is used by the controller to make decisions. Feedback is used to observe the controlled process. The device that enables the controller to act on the controlled process is called an actuator. The devices that help the controller sense feedback from the controlled process are called sensors.

The meaning of "hierarchical" in a hierarchical control structure is that the system may have multiple levels of controllers, with the higher-level controllers sending control actions to the lower-level controllers and controlled processes, and the lower-level controllers and controlled processes providing feedback to the higher-level controllers. Each hierarchical controller accepts control from the higher-level controllers while controlling the lower-level controllers and the controlled processes.

Although the hierarchical control structure model is simple to model, as mentioned above, it only reflects the static input and output relationships between components and lacks a description of the dynamic behavior between components. Therefore, although the STPA approach recognizes the importance of dynamic emergent behavior, the hierarchical control structure model used does not have the ability to support the accurate identification of a loss scenario in the dynamic emergent behavior of the system due to the above-mentioned deficiencies.

As an inventive improvement, the present invention utilizes a finite state machine to express the information provided by the hierarchical control structure of the system. A finite state machine is a mathematical model representing a finite number of states and migrations between states, which includes elements such as states, migrations, and migration conditions. Migration is the act of moving from one state to the next. The state before migration can be called the current state and the state after migration can be called the target state. Migration conditions are the basis of migration and may include time conditions, state conditions, synchronization conditions, etc. Additional elements can be added to the finite state machine as needed, for example, Effect can be added to the SysML state machine diagram, and Clock and Update can be added to the state machine modeled by UPPAAL.

Finite state machine is a common modeling technique used by industry and is easy to use. In addition, the use of languages such as SysML, AADL, and AltaRica to modeled system state machines helps integrate STPA analysis work with existing systems engineering work, facilitates the use of existing systems engineering results, reduces the time required for STPA modeling, and also reduces the semantic changes brought about by remodeling the model, which affects the quality of analysis.

The system state machine of the present invention can not only provide all the information that a control structure model can provide but can also describe the interaction behavior of the system or components in detail. The state machine can describe not only the high-level behavior of the system, but also the detailed behavior within the components. Thus, the state machine can describe the complete behavioral information of the system, and the controller, controlled process, sensors, and actuators can all be described using the state machine.

The system state machine of the present invention for identifying Unsafe Control Action (UCA) may include only the controller state machine, the controlled process state machine, and the interactions between them. According to the present invention, the controller behavior, the controlled process behavior, and the interactions between them required for UCA identification are all modeled using a state machine.

The system state machine of the present invention for identifying a loss scenario includes a controller state machine, a controlled process state machine, a sensor state machine, an actuator state machine, and the interactions among them. According to the present invention, the controller behavior, the controlled process behavior, the sensor behavior, the actuator behavior, and the interactions among them required for loss scenario identification are all modeled using a state machine. The system state machine used to identify a loss scenario is added with new elements compared to the system state machine used to identify unsafe control actions and can therefore be obtained by updating the latter.

In the present invention, the inputs and outputs of the system or components, the definition and change of the system state, the system control actions and feedback, environmental factors, and disturbances, can be included in the system state machine. The process model information and the control algorithm information required for UCA identification and loss scenario identification are expressed through the controller state machine.

In the present invention, the system state machine can be modeled using multiple languages, such as SysML, AADL, AltaRica, or even the modeling language provided by the Model Checking technology. The following is an example of the modeling process for modeling a system state machine using the SysML language, at which point the system state machine is modeled by the SysML system state machine diagram.

1. Create a SysML system state machine diagram for the system. Define the global variables and their initial values in the "General" property of the SysML system state machine diagram. Add State Machine elements to the SysML system state machine diagram to model state machines for controllers, controlled processes, sensors, and actuators.
2. The State Machine element is modeled as follows:
  2.1 Define local variables and their initial values in the "General" attribute of the State Machine element, and add the required Initial, State and Transition elements to the State Machine element;
  2.2 Point to the initial state of the State Machine element by the Initial element;
  2.3 The state invariant is expressed by the "Invariant" constraint attribute of the State element, and the state invariant is expressed by a Boolean formula, indicating that the state can be moved into the state only when the state invariant is satisfied, and that the state needs to be moved out of the state when the state invariant is not satisfied;
  2.4 The state transition process is represented by the Transition element, which is a directed element that must point from the source state to the target state; the "Guard" attribute of the Transition element is used to represent the transition condition, and the "Effect" attribute of the Transition element is used to represent the update;
  2.5 If synchronization exists in the system, the Synch element is used to describe the synchronization information, as follows:
    1) Add Synch elements to point to the Transition elements that need to be synchronized;
    2) Determine the identifier of the Synch element, with the same identifier indicating a synchronized Transition element.
  2.6 If the State Machine element needs to include the next level State Machine element, i.e., State Machine nesting, add the next level State Machine element to that State Machine element and model the next level State Machine element as described in steps 2.1, 2.2, 2.3, 2.4, 2.5; further State Machine elements may be added to the next level State Machine element as needed.
3. If the SysML system state machine diagram needs to describe time information, then use the MARTE (Modeling and Analysis of Real Time and Embedded Systems) element to describe time information, as follows:
  1) Add the Clock element to the SysML system state machine diagram to represent the global clock.
  2) Add the Clock element to the State Machine element where time information exists to indicate a local clock.
  3) If there is a time-dependent state invariant in the State element, then add a "TimedConstraint" element to the "Invariant" constraint attribute of the State element to express the state invariant.
  4) If there is a time update in the Transition element, then add a "ClockConstraint" element to the "Effect" attribute of the Transition element to express the time update.
  5) If there is a time constraint in the Transition element, then add a "TimedConstraint" element to the "Guard" attribute of the Transition element to express the time constraint.

Step 3: To Identify Unsafe Control Actions

In the third step, unsafe control actions can be identified using the losses identified in the first step and the system state machine modeled in the second step. The operations performed in the third step are described in detail below.

1. Unsafe control action (UCA) is {CA-PR, Type, Context}, which is a combination of control action (CA-PR: Control Action-Process Received), the type of UCA, and context, and this combination can lead to some system-level hazard. The hazard may be an identified system-level hazard, or it may be a new hazard that is about to be identified through the current third step.

Compared to the "STPA Handbook", the definition of UCA has been improved in this invention by defining UCA as a hazard, which is a combination of 3 elements, which are: the Control Action-Process Received (CA-PR), the type of UCA (Type), and the context (Context).

The properties of each CA-PR include the CA-PR's sender, receiver, and other data definitions, and the CA-PR is in the input position of the controlled process. When the actuator is not included in the system state machine, the CA-PR is also in the output position of the controller. When the actuator is included in the system state machine, the CA-PR is also in the output position of the actuator.

There are four types of UCA, as follows: UCA Type1 and UCA Type2 are time-independent "Type", and UCA Type3 and UCA Type4 are time-dependent "Type". UCAs that contain time-independent "Type" are called time-independent UCAs, and UCAs that contain time-related "Type" are called time-related UCAs.
  1) UCA Type1: Not providing the control action leads to a hazard.
  2) UCA Type2: Providing the control action leads to a hazard.
  3) UCA Type3: Providing a control action too early, too late, or in the wrong order.
  4) UCA Type4: The control action lasts too long or is stopped too soon (for continuous control actions, not discrete control actions).

Context is the state of the system and environment in which the UCA exists and is defined as a combination of the context state variables CVari {CVar1, CVar2, . . . , CVari, . . . , CVarn}. CVari may be: environmental conditions, the state of the controlled process, the state of the controller, previous control actions and parameters, etc.

UCA is a system-level hazard. UCA is sometimes referred to as Unwanted Control Action, Unexpected Control Actions, Hazardous Control Action, etc.

2. Determine the context variable CVari of Context and its possible values according to the SysML system state machine, and list all the instances of Context.

3. By traversal, all instances of {CA-PR, Type, Context} are given. Each instance of {CA-PR, Type, Context} is considered as a Potential UCA (PUCA). A PUCA containing a time-independent "Type" is called a time-independent PUCA, and a PUCA containing a time-dependent "Type" is called a time-dependent PUCA.

4. Based on the identified losses, analyze each PUCA one by one to determine whether it is a UCA.

For time-independent PUCAs, it can be determined directly from {CA-PR, Type, Context} whether the PUCA is a UCA or not.

For time-dependent UCA, it is necessary to instantiate the time-dependent "Type", that is, determine the specific meaning of the words "too early", "too late", "too long", "too fast", etc., describe the time characteristics more accurately, and then determine whether the PUCA is a UCA.

When a PUCA is identified as a UCA, the UCA will be one of the following two cases:

First case: The UCA is contained in the identified system-level hazards. In this case, the identified system-level hazards are not needed to be updated.

The second case: UCA is not included in the identified system-level hazards, then the UCA can be judged as a new system-level hazard. In this case, the UCA needs to be identified and included into the identified system-level hazards.

Step 4: To Identify Loss Scenarios

In the fourth step, the unsafe control actions identified in the third step and the model checking techniques are used to identify loss scenarios.

Model checking is an automated verification technique that consists of a model to be checked, a property to be checked, and a model checking algorithm. The advantage of model checking is that it can prove whether the model to be checked satisfies the properties to be checked, and if not, it can show how the model to be checked operates to violate the properties to be checked by means of a "counterexample". A counterexample is a trajectory of the model to be checked that shows how the model to be checked evolves from its initial state to the state when a property to be checked is violated. In the present invention, counterexample is used to identify a loss scenario. The to-be-checked property is sometimes referred to as the to- be-checked specification, the to-be-checked constraint. In the present invention, the system safety constraint is included as a to-be-checked property. Typically, model checking describes the model to be checked through a finite state migration graph and the property to be checked through formal logic. According to the present invention, the formal analysis of the state machine by the model checking technique converts the system state machine into a model checking model, which can identify a loss scenario accurately, automatically and efficiently.

The operations performed in step 4 are described in detail below.

1. Update the System State Machine

The updated system state machine includes the controller state machine, the controlled process state machine, the sensor state machine, the actuator state machine, and the interactions among them, as well as the state machines of the internal components of the controller, the controlled process, the sensor, and the actuator, and the interactions among the subcomponents.

The updated system state machine requires the construction of temporal properties when one of the following three cases exists.
1) Need to identify time-dependent UCA loss scenarios;
2) Causal factors (CF) for subsequent injection including temporal characteristics;
3) The system itself includes temporal characteristics.

System state machines can be modeled using multiple languages, such as SysML, AADL, AltaRica, modeling languages provided by model checking technologies, etc. The present invention preferably recommends the use of SysML and AADL for modeling system state machines because both are industry standards and both support nesting of state machines and modeling of temporal properties.

Refer to steps 1, 2, and 3 of the second step above for the method of modeling a system state machine using SysML, where step 3 of the second step describes the method of modeling temporal characteristics.

2. Model the Model Checking Model Based on the Updated System State Machine

UPPAAL is a widely used tool for real-time system model checking, which verifies the properties of real-time systems using model checking methods by building a temporal state machine model. The UPPAAL model modeled here can be directly used for model checking by UPPAAL. The following illustrates the method of modeling UPPAAL model based on the SysML system state machine.

2.1 Convert all variables and their initial values in the SysML state machine diagram to system declarations in the UPPAAL model;

2.2 If the SysML State Machine diagram does not have nested State Machines, i.e., the State Machine does not contain a State Machine, convert each State Machine element in the SysML State Machine diagram to a UPPAAL Template according to steps 2.3 and 2.4;

2.3 The method of forming a UPPAAL Template based on the State Machine element is as follows:

1) Convert the State element in the State Machine element to the location element in the UPPAAL model, convert the "Invariant" constraint attribute of the State element to the "Invariant" in the location element, and the Initial element in the State Machine element to the location element marked as Initial in the UPPAAL model;

2) Convert the Transition element in the State Machine element to the edge element in the UPPAAL model, convert the "Guard" attribute of the Transition element of the State Machine to "Guard" of the edge element in the UPPAAL model, and convert the "Effect" attribute of the Transition element in the State Machine element to "Update" of the edge element in the UPPAAL model;

3) Convert the Synch element of the State Machine element to "Sync" in the transition of UPPAAL model.

2.4 Methods for converting MARTE elements describing time information into the UPPAAL model:

1) Convert the Clock element in the MARTE model to a clock in the UPPAAL model;

2) Convert the ClockConstraint element in the MARTE model to "Update" in the transition of UPPAAL model;

3) Convert the TimedConstraint element in the MARTE model to "Guard" in the transition of UPPAAL model or "Invariant" in the UPPAAL model.

2.5 If the SysML State Machine diagram has State Machine nesting, i.e., State Machine contains State Machine, the method of forming the UPPAAL model is as follows:

1) The State Machine element directly included in the SysML State Machine diagram is called the highest-level State Machine and marked as the level 1 State Machine, the State Machine directly included in the level 1 State Machine is marked as the level 2 State Machine, the State Machine directly included in the level 2 State Machine is marked as level 3 State Machine, and so on, and the lowest level State Machine is marked as level N State Machine;

2) Select a State Machine of level N and convert it to the UPPAAL template according to the steps 2.3 and 2.4. Repeat this step until all State Machines of level N are converted to the corresponding UPPAAL template. Let i take the values 1, 2, 3, . . . , (N−1), and perform step 3) after taking each value;

3) Select a State Machine of level (N−i), eliminate the State Machine of level (N−i+1) contained in it, and convert the remaining part to the UPPAAL Template according to the steps 2.3 and 2.4. Repeat until this step is performed for all State Machines at level (N−i).

3. Determine the Safety Constraints of the System According to the System-Level Hazards and Describe the Safety Constraints Using a Logical Language Supported by Model Checking Technology to Generate the Properties to be Checked.

After this step, each system-level hazard corresponds to a system safety constraint, and each system safety constraint corresponds to a property to be checked.

The safety constraint of the system can be defined as the complement of set of UCA, the constituent element CA-PR, which is at the input position of the controlled process, i.e. the output position of the actuator, but not the output position of the controller.

Time-related UCAs such as "too early", "too late", "wrong order", "lasts too long", and "end too soon", etc. can be expressed by time information. By adding time information to the state machine components and setting the relationship between time information, the above time relationship can be expressed.

The difference between building a model property to be checked for time-independent UCA and building a model property to be checked for time-dependent UCA is that the latter requires the use of clock variables when describing the system safety constraints.

When using model checking techniques that include clock variables, time-dependent system safety constraints can be described directly using the logic language they support. For example, when using UPPAAL, time-dependent system safety constraints can be described directly using Timed Computation Tree Logic (TCTL), the temporal logic language used by the UPPAAL tool, which describes time-dependent system paths expanded through a tree structure.

When using model checking techniques that do not include clock variables, the clock can be customized using the modeling language provided by the model checking technique, and then the time-dependent system safety constraints can be described using the logic language supported by the model checking technique. For example, when using NuSMV, the Clock variable can be customized, and then a logic language such as Computation Tree Logic (CTL), Linear Temporal Logic (LTL), or Real-Time Computation Tree Logic (RTCTL) and other logic languages can be used to describe time-dependent system safety constraints.

The following is an example of how the properties to be checked are generated in the TCTL logic language supported by UPPAAL.

1) The properties to be checked include "universal/existential quantification", "globe/future operators", and "system safety constraint state description", and the order of the three parts cannot be changed.

2) Determine the nature of the quantification. If the system safety constraint describes entire system states, then use the universal quantification "A", which means "All". If the system safety constraint describes one or some system states, then use the existential quantification "E", which means "Exist".

3) Determine the operator. If the system needs to satisfy the safety constraint from the initial state, the globe operator IF is used, and if the system satisfies the safety constraint in some future state, the future operator "< >" is used.

4) Determine the logical relationship of system safety constraint state description. Use "and", "or", "not", "imply" to connect states in a system safety constraint. If the system safety constraint involves a deadlock, the keyword "deadlock" is used.

4. The model checking technique is used to analyze whether the model checking model formed in step 2 satisfies the properties to be checked formed in step 3. If violated, the model checking technique gives a counterexample, which is a loss scenario leading to a system-level hazard. This step is repeated until the UPPAAL model has completed model checking for all the properties to be checked.

A loss scenario of the present invention is defined as a process in which a system generates a system-level hazard with the involvement of causal factors.

5. Model the "system second state machine with CF added", convert it into a model checking model, and check the property to be checked.

5.1 In the system second state machine in step 1, inject the Causal Factors (CF) to model the "second system state machine with CF added".

The state, the target state of migration, migration conditions (including time conditions, state conditions, synchronization conditions, etc.), and migration actions are the constituent elements of the state machine. Each CF can be implemented by changing one or several state machine constituent elements.

Select one or several CFs and inject them into the system second state machine by changing the state machine components to form a "system second state machine with CF added". Repeat until all the required "system second state machines with CF added" are modeled.

It is also possible to inject all possible CFs into the system second state machine at the same time, forming a "system second state machine with CF added". The model checking work based on this system second state machine can discover the hazardous emergent behavior of the system under the interaction of multiple components and multiple CFs.

5.2 Model the model checking model based on the "system second state machine with CF added", see step 2 for the modeling method.

5.3 The model checking technique is used to analyze whether the model checking model in step 5.2 satisfies the properties to be checked as formed in step 3. If violated, the model checking technique gives a counterexample, which is a loss scenario leading to a system-level hazard.

The above describes an STPA method for accurately identifying loss scenarios of the present invention. The present invention also relates to an STPA device for accurately identifying loss scenarios.

An STPA device for accurately identifying loss scenarios according to an embodiment of the present invention includes four units: an analysis purpose defining unit, a state machine modeling unit, an unsafe action identification unit, and loss scenario identification unit. These four units are described in detail below.

First, the Analysis Purpose Defining Unit:

The analysis purpose defining unit is responsible for defining the analysis purposes, including identifying losses. According to a preferred embodiment, defining purposes may also include identifying system-level hazards, identifying system-level safety constraints, and identifying refine hazards.

The analysis purpose defining unit needs to identify at least the losses. The identified losses enable the identification of unsafe control actions in subsequent steps. Losses involve something of value to stakeholders. Losses may include loss of life or personal injury, property damage, environmental contamination, mission failure, loss or disclosure of sensitive information, or other losses that are unacceptable to the stakeholders.

The analysis purpose defining unit also identifies system-level hazards, defines system-level safety constraints, and refines purposes such as hazards to reduce the workload of subsequent steps.

In the context of the present invention, a system is a set of components that act together to achieve a common goal. A system may include multiple subsystems or may be a component of a larger system. A hazard is a system state or set of conditions that will result in a loss under specific worst-case environmental conditions. System-level safety constraints specify the system conditions or behaviors that need to be met to prevent a hazard (and ultimately prevent a loss). The "STPA Handbook" provides specific explanations of system-level hazards and system-level safety constraints on pages 17 and 20, respectively.

A refined hazard is a system-level hazard that is broken down into several sub-hazards. For example, if "the aircraft is too close to other objects on the ground", a sub-hazard of that hazard is: "the aircraft accelerates too much during taxiing". Page 21 of the "STPA Handbook" provides a specific explanation of refined hazards.

Second, the State Machine Modeling Unit:

The state machine modeling unit is responsible for modeling system state machines using finite state machines.

The hierarchical control structure model is described and adopted in the "STPA Handbook" released by Nancy Leveson and John Thomas of MIT in 2018.

A hierarchical control structure is a model of a system consisting of feedback control loops. An effective control structure will impose constraints on the behavior of the entire system. The control structure includes inputs and outputs for the controller, control actions, feedback, control actions, controlled processes, and other pieces. Actuators and sensors are also typically added to the hierarchical control structure when performing loss scenario identification. The controller provides control actions to control the process and imposes constraints on the behavior of the controlled process. The controller includes a control algorithm and a process model. The control algorithm represents the controller's decision process, which determines the control actions to be provided. The process model is the controller's knowledge of the controlled process and other relevant aspects of the system or environment, which is used by the controller to make decisions. Feedback is used to observe the controlled process. The device that enables the controller to act on the controlled process is called an actuator. The devices that help the controller sense feedback from the controlled process are called sensors.

The meaning of "hierarchical" in a hierarchical control structure is that the system may have multiple levels of controllers, with the higher-level controllers sending control actions to the lower-level controllers and controlled processes, and the lower-level controllers and controlled processes providing feedback to the higher-level controllers. Each hierarchical controller accepts control from the higher-level controllers while controlling the lower-level controllers and the controlled process.

Although the hierarchical control structure model is simple to model, as mentioned above, it only reflects the static input and output relationships between components and lacks a description of the dynamic behavior between components. Therefore, although the STPA approach recognizes the importance of dynamic emergent behavior, the hierarchical control structure model used does not have the ability to support the accurate identification of a loss scenario in the dynamic emergent behavior of the system due to the above-mentioned deficiencies.

As an inventive improvement, the present invention utilizes a finite state machine to express the information provided by the hierarchical control structure of the system. A finite state machine is a mathematical model representing a finite number of states and migrations between states, which includes elements such as states, migrations, and migration conditions. Migration is the act of moving from one state to the next. The state before migration can be called the current state and the state after migration can be called the target state. Migration conditions are the basis of migration and may include time conditions, state conditions, synchronization conditions, etc. Additional elements can be added to the finite state machine as needed, for example, Effect can be added to the SysML state machine diagram, and Clock and Update can be added to the state machine built by UPPAAL.

Finite state machine is a common modeling technique used by industry and is easy to use. In addition, the use of languages such as SysML, AADL, and AltaRica to model system state machines helps integrate STPA analysis work with existing systems engineering work, facilitates the use of existing systems engineering results, reduces the time required for STPA modeling, and also reduces the semantic changes brought about by remodeling the model, which affects the quality of analysis.

The system state machine of the present invention can not only provide all the information that a control structure model can provide but can also describe the interaction behavior of the system or components in detail. The state machine can describe not only the high-level behavior of the system, but also the detailed behavior within the components. Thus, the state machine can describe the complete behavioral information of the system, and the controller, controlled process, sensors, and actuators can all be described using the state machine.

The system state machine of the present invention for identifying Unsafe Control Action (UCA) may include only the controller state machine, the controlled process state machine, and the interactions between them. According to the present invention, the controller behavior, the controlled process behavior, and the interactions between them required for UCA identification are all modeled using a state machine.

The system state machine of the present invention for identifying a loss scenario includes a controller state machine, a controlled process state machine, a sensor state machine, an actuator state machine, and the interactions among them. According to the present invention, the controller behavior, the controlled process behavior, the sensor behavior, the actuator behavior, and the interactions among them required for loss scenario identification are all modeled using a state machine. The system state machine used to identify a loss scenario is added with new elements compared to the system state machine used to identify unsafe control actions and can therefore be obtained by updating the latter.

In the present invention, the inputs and outputs of the system or components, the definition and change of the system state, the system control actions and feedback, environmental factors, and disturbances, can be included in the system state machine. The process model information and the control algorithm information required for UCA identification and loss scenario identification are expressed through the controller state machine.

In the present invention, the system state machine can be modeled using multiple languages, such as SysML, AADL, AltaRica, or even the modeling language provided by the Model Checking technology. The following is an example of the modeling process for modeling a system state machine using the SysML language, at which point the system state machine is the SysML system state machine diagram.

1. Create a SysML system state machine diagram for the system. Define the global variables and their initial values in the "General" attributes of the SysML system state machine diagram. Add State Machine elements to the SysML system state machine diagram to model state machines for controllers, controlled processes, sensors, and actuators.

2. The State Machine element is modeled as follows:
2.1 Define local variables and their initial values in the "General" attribute of the State Machine element and add the required Initial, State and Transition elements to the State Machine element;
2.2 Point to the initial state of the State Machine element by the Initial element;
2.3 The state invariant is expressed by the "Invariant" constraint attribute of the State element, and the state invariant is expressed by a Boolean formula, indicating that the state can be moved into the state only when the state invariant is satisfied, and that the state needs to be moved out of the state when the state invariant is not satisfied;
2.4 The state transition process is represented by the Transition element, which is a directed element that must point from the source state to the target state; the "Guard" attribute of the Transition element is used to represent the transition condition, and the "Effect" attribute of the Transition element is used to represent the update;
2.5 If synchronization exists in the system, the Synch element is used to describe the synchronization information, as follows.
1) Add Synch elements to point to the Transition elements that need to be synchronized.
2) Determine the identifier of the Synch element, with the same identifier indicating a synchronized Transition element.
2.6 If the State Machine element needs to include the next level State Machine element, i.e., State Machine nesting, add the next level State Machine element to that State Machine element and model the next level State Machine element as described in steps 2.1, 2.2, 2.3, 2.4, 2.5; lower level State Machine elements can be added to the next level State Machine element as needed.

3. If the SysML system state machine diagram needs to describe time information, then use the MARTE (Modeling and Analysis of Real Time and Embedded Systems) element to describe time information, as follows:
1) Add the Clock element to the SysML system state machine diagram to represent the global clock.
2) Add the Clock element to the State Machine element where time information exists to indicate a local clock.
3) If there is a time-dependent state invariant in the State element, then add a "TimedConstraint" element to the "Invariant" constraint attribute of the State element to express the state invariant.
4) If there is a time update in the Transition element, then add a "ClockConstraint" element to the "Effect" attribute of the Transition element to express the time update.
5) If there is a time constraint in the Transition element, then add a "TimedConstraint" element to the "Guard" attribute of the Transition element to express the time constraint.

Third, the Unsafe Action Identification Unit:

The unsafe action identification unit is responsible for identifying unsafe control actions using the losses identified in the first step and the system state machine modeled in the second step. The unsafe control action identification unit is described in detail below.

1. Unsafe control action (UCA) is {CA-PR, Type, Context}, which is a combination of control action (CA-PR: Control Action-Process Received), the type of UCA, and context, and this combination can lead to a system-level hazard. The hazard may be an identified system-level hazard or a new hazard that is about to be identified through the current unsafe control action identification unit.

Compared to the "STPA Handbook", the definition of UCA has been improved in this invention by defining UCA as a hazard, which is a combination of 3 elements, which are: the Control Action-Process Received (CA-PR), the type of UCA (Type), the context (Context).

The properties of each CA include the sender, receiver, and other data definitions for that CA, which is in the input position of the controlled process. When the system state machine does not include an actuator, the CA is also in the output position of the controller. When an actuator is included in the system state machine, the CA is also in the output position of the actuator.

There are four types of UCA, as follows: UCA Type1 and UCA Type2 are time-independent "Type", and UCA Type3 and UCA Type4 are time-dependent "Type". UCAs that contain time-independent "Type" are called time-independent UCAs, and UCAs that contain time-related "Type" are called time-related UCAs.

1) UCA Type1: Not providing the control action leads to a hazard.
2) UCA Type2: Providing the control action leads to a hazard.
3) UCA Type3: Provided a control action, but provided too early, too late, or in the wrong order.
4) UCA Type4: The control action lasts too long or is stopped too soon (for continuous control actions, not discrete control actions).

Context is the state of the system and environment in which the UCA is located and is defined as a combination of the context state variables CVari {CVar1, CVar2, . . . , CVari, . . . , CVarn}. CVari may be: environmental conditions, the state of the controlled process, the state of the controller, previous control actions and parameters, etc.

UCA is a system-level hazard. UCA is sometimes referred to as Unwanted Control Action, Unexpected Control Actions, Hazardous Control Action, etc.

2. Determine the context variable CVari of Context and its possible values according to the SysML system state machine, and list all the instances of Context.

3. By traversal, all instances of {CA, Type, Context} are given. Each instance of {CA, Type, Context} is considered as a Potential UCA (PUCA). A PUCA containing a time-independent "Type" is called a time-independent PUCA, and a PUCA containing a time-dependent "Type" is called a time-dependent PUCA.

4. Based on the identified losses, analyze each PUCA one by one to determine whether it is a UCA.

For time-independent PUCAs, it can be determined directly from {CA, Type, Context} whether the PUCA is a UCA or not.

For time-dependent UCA, it is necessary to instantiate the time-dependent "Type", that is, determine the specific meaning of the words "too early", "too late", "too long", "too fast", etc., describe the time characteristics more accurately, and then determine whether the PUCA is a UCA.

When a PUCA is identified as a UCA, the UCA will be one of the following two cases:

First case: The UCA is contained in the identified system-level hazards. In this case, there is no need to update the identified system-level hazards.

The second case: UCA is not included in the identified system-level hazards, then the UCA can be judged as a new system-level hazard. In this case, the UCA needs to be identified and included into the identified system-level hazards.

Fourth, the Loss Scenario Identification Unit:

The loss scenario identification unit is responsible for identifying a loss scenario using the unsafe control actions and model checking techniques identified in the third step.

Model checking is an automated verification technique that consists of a model to be checked, a property to be checked, and a model checking algorithm. The advantage of model checking is that it can prove whether the model to be checked satisfies the properties to be checked, and if not, it can show how the model to be checked operates to violate the properties to be checked by means of a "counterexample". A counterexample is a trajectory of the model to be checked that shows how the model to be checked evolves from its initial state to the state when a property to be checked is violated. In the present invention, counterexample is used to identify a loss scenario. The to-be-checked property is sometimes referred to as the to-be-checked specification, the to-be-checked constraint. In the present invention, the system safety constraint is included as a to-be-checked property. Typically, model checking describes the model to be checked through a finite state migration graph and the property to be checked through formal logic.

Model checking describes the model to be checked through a state transition process (typically a state machine, but also other formal languages that can describe state transitions, such as Promela language, activity diagrams, etc.); defines the properties to be checked through formal statements; and determines whether the system model satisfies the properties to be checked through an algorithm that can give examples that do not satisfy the properties. The properties to be checked are used to describe the properties and behaviors that the designer or other person expects to be checked. The properties are usually described using formal logic, and in hardware and software systems are usually described using temporal logic. According to the present invention, the formal analysis of the state machine by model checking techniques converts the model of the control structure by the state machine into a model checking model, which can identify a loss scenario accurately, automatically and efficiently.

The functions that the loss scenario identification unit is responsible for performing are described in detail below.

1. Update the system state machine, the updated system state machine includes the controller state machine, the controlled process state machine, the sensor state machine, the actuator state machine and the interaction among them, as well as the state machines of the internal components of the controller, the controlled process, the sensor, and the actuator, and the interactions among the subcomponents.

The updated system state machine requires the construction of temporal properties when one of the following three cases exists.

1) Need to identify time-dependent UCA loss scenarios;
2) Causal factors (CF) for subsequent injection including temporal characteristics;
3) The system itself includes temporal characteristics.

System state machines can be modeled using multiple languages, such as SysML, AADL, AltaRica, modeling languages provided by model checking technologies, etc. The present invention preferably recommends the use of SysML and AADL for modeling system state machines because both are industry standards and both support nesting of state machines and modeling of temporal properties.

The method of modeling a system state machine using SysML is described in steps 1, 2, and 3 above, which are performed by the state machine modeling unit, where step 3, performed by the state machine modeling unit, describes the method of modeling temporal characteristics.

2. Model a model checking model based on the updated system state machine.

The following illustrates the method of modeling the UPPAAL model based on the SysML system state machine.

2.1 Convert all variables and their initial values in the SysML state machine diagram to system declarations in the UPPAAL model;

2.2 If the SysML State Machine diagram does not exist State Machine nesting, i.e., the State Machine does not contain a State Machine, convert each State Machine element in the SysML State Machine diagram into a UPPAAL template Template according to steps 2.3 and 2.4;

2.3 The method of forming a UPPAAL template Template based on the State Machine element is as follows.

1) Convert the State element in the State Machine element to the location element in the UPPAAL model, convert the "Invariant" constraint attribute of the State element to the "Invariant" in the location element, and the Initial element in the State Machine element to the location element marked as Initial in the UPPAAL model;

2) Convert the Transition element in the State Machine element to the edge element in the UPPAAL model, convert the"Guard" attribute of the Transition element of the State Machine to "Guard" of the edge element in the UPPAAL model, and convert the "Effect" attribute of the Transition element in the State Machine element to "Update" of the edge element in the UPPAAL model;

3) Convert the Synch element of the State Machine element to "Sync" in the transition of UPPAAL model.

2.4 Methods for converting MARTE elements describing time information into the UPPAAL model.

1) Convert the Clock element in the MARTE model to a clock in the UPPAAL model;

2) Convert the ClockConstraint element in the MARTE model to "Update" in the transition of UPPAAL model;

3) Convert the TimedConstraint element in the MARTE model to "Guard" in the transition of UPPAAL model or "Invariant" in the UPPAAL model.

2.5 If the SysML State Machine diagram exists State Machine nesting, i.e., State Machine contains State Machine, the method of forming the UPPAAL model is as follows.

1) The State Machine element directly included in the SysML State Machine diagram is called the highest-level State Machine and labeled as the level 1 State Machine, the State Machine directly included in the level 1 State Machine is marked as the level 2 State Machine, the State Machine directly included in the level 2 State Machine is marked as level 3 State Machine, and so on, and the lowest level State Machine is marked as level N State Machine;

2) Select a State Machine of level N and convert it to the UPPAAL Template according to the steps 2.3 and 2.4. Repeat this step until all State Machines of level N are converted to the corresponding UPPAAL Template. Let i take the values 1, 2, 3, . . . , (N−1), and perform step 3) after taking each value;

3) Select a State Machine of level (N−i), eliminate the State Machine of level (N−i+1) contained in it, and convert the remaining part to the UPPAAL Template according to the steps 2.3 and 2.4. Repeat until this step is performed for all State Machines at level (N−i).

3. Determine the safety constraints of the system according to the system-level hazards and describe the safety constraints using the logic language supported by model checking technology to form the properties to be checked. After this step, each system-level hazard corresponds to a safety constraint of the system, and each safety constraint of the system corresponds to a property to be checked.

The safety constraint of the system can be defined as the complement of set of the UCA, the constituent element CA of the UCA, which is the CA received by the controlled process, is at the input position of the controlled process, i.e., the output position of the actuator, but not the output position of the controller.

Time-dependent UCAs such as "too early", "too late", "wrong order", "lasts too long", and "end too soon", etc. can be expressed by time information. By adding time information to the state machine components and setting the relationship between time information, the above time relationship can be expressed.

The difference between building a model property to be checked for time-independent UCA and building a model property to be checked for time-dependent UCA is that the latter requires the use of clock variables when describing the system safety constraints.

When using model checking techniques that include clock variables, time-dependent system safety constraints can be described directly using the logic language they support. For example, when using UPPAAL, the time-dependent system safety constraints can be described directly using Timed Computation Tree Logic (TCTL).

When using model checking techniques that do not include clock variables, the clock can be customized using the modeling language provided by the model checking technique, and then the time-dependent system safety constraints can be described using the logic language supported by the model checking technique. For example, when using NuSMV, the Clock variable can be customized, and then a logic language such as Computation Tree Logic (CTL), Linear Temporal Logic (LTL), or Real-Time Computation Tree Logic (RTCTL) and other logic languages can be used to describe time-dependent system safety constraints.

The following is an example of how the properties to be checked are generated in the TCTL logic language supported by UPPAAL.

1) The properties to be checked include "universal/existential quantification", "globe/future operator", and "system safety constraint state description", and the order of the three parts cannot be changed. The order of the three parts cannot be changed.

2) Determine the quantification. If the system safety constraint describes entire system states, then use the universal quantification "A", which means "All". If the system safety constraint describes one or some system states, then use the existential quantification "E", which means "Exist".

3) Determine the operator. If the system needs to satisfy the safety constraint from the initial state, the globe operator IF is used, and if the system satisfies the safety constraint in some future state, the future operator "< >" is used.

4) Determine the logical relationship of system safety constraint state description. Use "and", "or", "not", "imply" to connect states in a system safety constraint. If the system safety constraint involves a deadlock, the keyword "deadlock" is used.

4. The model checking technique is used to analyze whether the model checking model formed in step 2 satisfies the properties to be checked formed in step 3. If violated, the model checking technique gives a counterexample, which is a loss scenario leading to a system-level hazard. This step is repeated until the UPPAAL model has completed model checking for all the properties to be checked.

5. Model the "system second state machine with CF added", convert it into a model checking model, and check the property to be checked.

5.1 In the second state machine of the system in step 1, inject the Causal Factors (CF) to model the "system second state machine with CF added".

The state, the target state of migration, migration conditions (including time conditions, state conditions, synchronization conditions, etc.), and migration actions are the constituent elements of the state machine. Each CF can be implemented by changing one or several state machine constituent elements.

Select one or several CFs and inject them into the system second state machine by changing the state machine components to form a "system second state machine with CF added". Repeat until all the required "system second state machines with CF added" are modeled.

It is also possible to inject all possible CFs into the system second state machine at the same time, forming a "system second state machine with CF added". The model checking work based on this system second state machine can discover the hazardous emergent behavior of the system under the interaction of multiple components and multiple CFs.

5.2 Model the model checking model based on the "system second state machine with CF added", see step 2 for the modeling method.

5.3 The model checking technique is used to analyze whether the model checking model in step 5.2 satisfies the properties to be checked as formed in step 3. If violated, the model checking technique gives a counterexample, which is a loss scenario leading to a system-level hazard.

The above-described embodiments of the device are only schematic. The division of the units may be based on a logical functional division, and other divisions may be used in practical implementation. For example, multiple units can be combined or can be integrated into another unit or system. Each of the above units can be implemented either in the form of a hardware or a software functional unit.

Each of the above units, when implemented as a software functional unit and sold or used as a separate product, may be stored in a computer readable storage medium. Based on this understanding, the technical solution of the present invention may be embodied in the form of a software product stored in a storage medium comprising several instructions to cause a processor of a computer device to perform all or some of the steps of the method of various embodiments of the present invention. The storage media includes, but is not limited to, flash drives, read-only memory (ROM), random access memory (RAM), removable hard drives, disks, or CD-ROMs, and other media that can store program code.

In the above embodiment, SysML/MARTE is used to model the system state machine and UPPAAL is used for model checking. The present invention can also use other languages to model the system state machine, and similarly, other model checking tools can be used to identify a loss scenario.

Model Checking Using NuSMV

Model checking can be performed using NuSMV instead of UPPAAL in the above embodiment. After using NuSMV instead of UPPAAL, two main changes are involved. The first one is that the properties to be checked are described using the CTL, LTL, and RTCTL logical languages supported by NuSMV, and this work can be done according to the specifications of CTL, LTL, and RTCTL. The second change is to replace the work of forming the UPPAAL model based on the SysML/MARTE model in the original technical solution with forming the NuSMV model based on the SysML/MARTE model.

The specific method for forming the NuSMV model based on the SysML/MARTE model is as follows:

1. Convert the global variables in the SysML state machine diagram to global variables declared by NuSMV with the VAR keyword, convert the initial values in the SysML State Machine diagram to init statements in NuSMV main MODULE.

2. Convert the State Machine elements in the SysML state machine diagram to state machines in the NuSMV model, so that each State Machine element in the SysML state machine diagram corresponds to a NuSMV state machine, respectively, as follows:
   1) Convert the variables in the State Machine element of the SysML state machine diagram to variable declarations in the NuSMV main MODULE, convert the initial values of the variables to init statements;
   2) Convert the name of the State Machine element in the SysML state machine diagram to the NuSMV state machine name identifier; convert the names of all the State elements of the State Machine element in the SysML state machine diagram to the NuSMV state machine state identifier; convert the Initial element in the State Machine element to the init statement in the NuSMV model;
   3) Convert the Transition elements contained in the State Machine element in the SysML state machine diagram to the NuSMV state machines; convert the transition conditions of the Transition element contained in the State Machine element in the SysML state machine diagram to the transition conditions of the transition statements in the NuSMV model; convert the target state of the Transition element migration of the State Machine element in the SysML state machine diagram to the state identifier of the NuSMV model transition statement;

Convert the "Invariant" attribute of the State element to the transition condition in the NuSMV model with the State element as the target state and convert the "Invariant" attribute of the State element to the transition condition in the NuSMV model with the State element as the source state after the "logical not" operation;
   4) Add the name identifier of the current State Machine element into the NuSMV model default transition statement.
   5) Since NuSMV state machine supports synchronization, no additional processing of synchronization is required.

3. If the SysML system state machine model uses the MARTE element to describe the time information, the MARTE element can be converted to the NuSMV model as follows:
   1) Convert the Clock element in the MARTE model to an integer variable in the NuSMV model and define the Clock with next(clockname):=clockname+1;
   2) Convert the ClockConstraint element in the MARTE model to a NuSMV state machine model and define its "Update" attribute as a state machine transition statement;
   3) Convert the TimedConstraint element in the MARTE model to a transition condition for the transition statement in the NuSMV state machine.

Modeling a System Model Using AADL

The system model can be modeled using AADL, and then the model modeled by AADL can be converted to the model modeled by UPPAAL.

The AADL system modeling approach is as follows.
1. Create the package of the AADL model for the system and name the package the name of the system model;
2. Declare the global variables in the public part of package, add the global variables in the form of Data Component and initialize the system variables in the features of System Component. System synchronization relationship is added in the form of port in the features of System Component;
3. Model a behavioral model of AADL for the system behavior, and the behavioral model is described by using the behavior annex, which is modeled as follows:
   1) Add Annex behavior specification to the System Component of the AADL model. When there are nested components, Annex behavior specification needs to be added to the System Subcomponent.
   2) Define the variables of the state machine in the variables of Annex behavior specification.
   3) Define the state of the state machine in states of Annex behavior specification.
   4) Define the transition conditions of the state machine in the guard elements of transitions of Annex behavior specification, and define the update of variables in action elements.
4. Define the synchronization relationship by the port of the connection;
5. Implement clock variables by defining the Data component with the identifier Clock, and the time relationship of the system is expressed through the guard and action elements of the Clock variable in transitions;
6. The component nesting relationship can be achieved by adding a System Subcomponent to the System Component, and if needed, you can continue to add a System Subcomponent to the System Subcomponent. Model the System Subcomponent as described in steps 3, 4, and 5.

In the present invention, the method of modeling the UPPAAL model based on the AADL model is as follows:
1. Convert the package name in AADL to the name of the UPPAAL model;
2. Convert the global variables in the AADL model to global variables in the UPPAAL model as follows:
   1) Convert the components of type Data of the AADL model and their initialization information into system declarations and their initialization information in the UPPAAL model.
   2) Convert the port connected by connection in the System Component of the AADL model to a variable of type chan in the UPPAAL model.
3. Convert the System Component of the AADL model to the UPPAAL Template as follows:
   3.1 Convert the name of the System Component of the AADL model to the name of the Template of UPPAAL;

3.2 Convert the variables in Annex behavior specification of System Component of the AADL model to the declarations of local variables of the UPPAAL model. Convert the state elements of states in the Annex behavior specification to the location elements in the UPPAAL model. Convert the guard elements of transitions (except port) in the Annex behavior specification to the guard elements in UPPAAL model, convert the action elements of transitions in Annex behavior specification to the update elements in the UPPAAL model;
4. Convert the port of transitions in the behavior annex to Sync in the UPPAAL model.
5. The conversion of time variables is the same as the conversion of transitions in 3.2.
6. If there is component nesting in the AADL model, the component nesting structure will be sprawled out and transformed according to steps 2, 3, 4 and 5.

Building a System State Machine with AltaRica

This scenario uses AltaRica to model the system state machine, and then converts the AltaRica model to the NuSMV model. AltaRica can be used to model the system state machine if the following situations exist: 1) the system state machine does not need to model time characteristics; 2) there is no need to inject time-related CFs into the system state machine; 3) there is no need to identify scenarios with time-related UCAs; and 4) there is no need to use the state machine nesting mechanism.

The AltaRica system state machine model can be modeled as follows:
1. Define global variables in the AltaRica model and declare each state machine using the "domain" keyword;
2. Define the variables, the names and states of each state machine in the "block System" of the AltaRica model, and then use the "init" statement to define the initial value of each state machine of the system;
3. Use the "switch-case" statement to describe the migration process of each state machine in the "block system" of AltaRica model, the condition of the switch-case statement indicates the migration condition, the result of the switch-case statement indicates the target state of migration, and the "default" keyword in the switch-case statement indicates the default state of each state machine.

The NuSMV model can be formed based on the AltaRica model as follows:
1. Convert the global variables in the AltaRica model to global variables declared using the "VAR" keyword in the NuSMV model; convert the "block System" module in the AltaRica model to the "main MODULE" module in the NuSMV model;
2. Convert the state machine defined in the AltaRica model to the state machine of the same name in the NuSMV model, as follows:
2.1 Convert the variables and initialization in the "block System" of the AltaRica model to variable declarations in the NuSMV "main MODULE";
2.2 Convert the state of the state machine defined by AltaRica to the state of the corresponding state machine of NuSMV; convert the "init" statement of the AltaRica state machine to the "init" statement of the NuSMV state machine;
2.3 Convert the state machine migration process defined in the "switch-case" statement of the AltaRica model to the NuSMV state machine migration process; convert the state migration conditions in the "switch-case" statement of the AltaRica model to the NuSMV state machine migration conditions; convert the migrated target state in the switch-case statement of the AltaRica model to the target state of the NuSMV state machine migration; convert the default state represented by the "default" keyword in the "switch-case" statement of the AltaRica model to the default migration state of the NuSMV state machine.

The following is the embodiment of a train door control to illustrate the implementation of the technical solution. Of course, the invention is not limited to train car door control application scenarios, and it is understood by those skilled in the art that the invention can be applied to any other similar scenarios and systems that require safety analysis.

Step 1: To Define the Purpose of the Analysis
1. Complete the following tasks: Identify losses, identify system-level hazards, identify system-level safety constraints, refine hazards.

For the sake of brevity and clarity of the embodiment, the invention considers only the hazards associated with a stationary train and with the doors aligned with the platform.

The loss (L: Loss) determined by this step is:
L: The door squeezes the person or object on the doorway, resulting in damage to the person, object, and door.

The system-level hazard (H: Hazard) identified is:
H1: The door receives a close command when the door is in the fully open state and there is a block (i.e. obstacle or obstruction) in the doorway.

The identified system-level safety constraint (SC) is:
$SC_{H1}$: When the door is fully open and there is a block in the doorway, the door cannot receive a close command.

Step 2: To model system state machine
1. Create the SysML system state machine diagram for the system. Define the global variables and their initial values in the "General" property of the SysML system state machine diagram. Add State Machine elements to the SysML state machine diagram to model state machines for controllers, controlled processes, sensors, and actuators.

The global variables defined in the General property are shown in the following table.

TABLE 1

| Variable Name | Variable Type | Range of values | Initial Value | Description |
|---|---|---|---|---|
| tDoorOpening | Clock | \ | \ | Record the train door opening time. |
| tDoorClosing | Clock | \ | \ | Record the train door closing time. |
| controllerOutput | int | {0, 1} | 0 | The command issued by the controller to control the opening or closing of the train door, 0 indicates the closing command, 1 indicates the opening command. |

Figure 2:
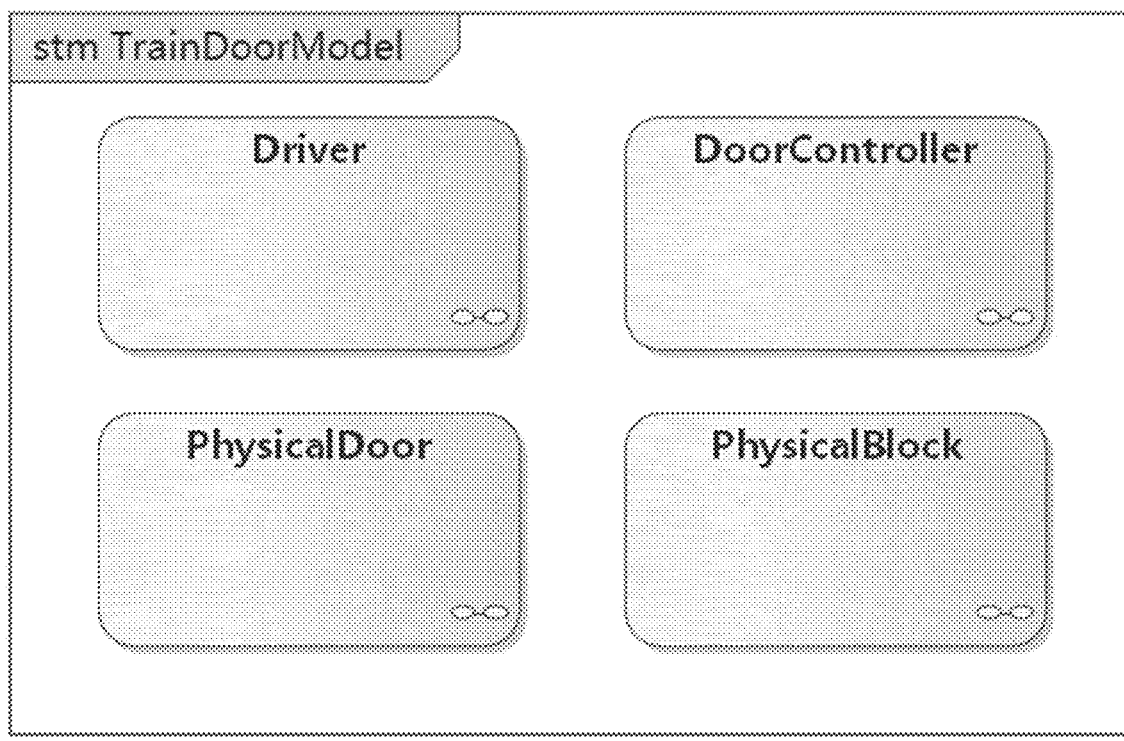
FIG. 2 shows a diagram of the system state machine in the embodiment of train door control.

The system state machine diagram is shown in FIG. 2 and contains four sub-state machines: driver, train door controller, train door, and block.

2. State Machine Element Modeling

The specific steps are described in the technical proposal, and only the results are shown here.

Figure 3:
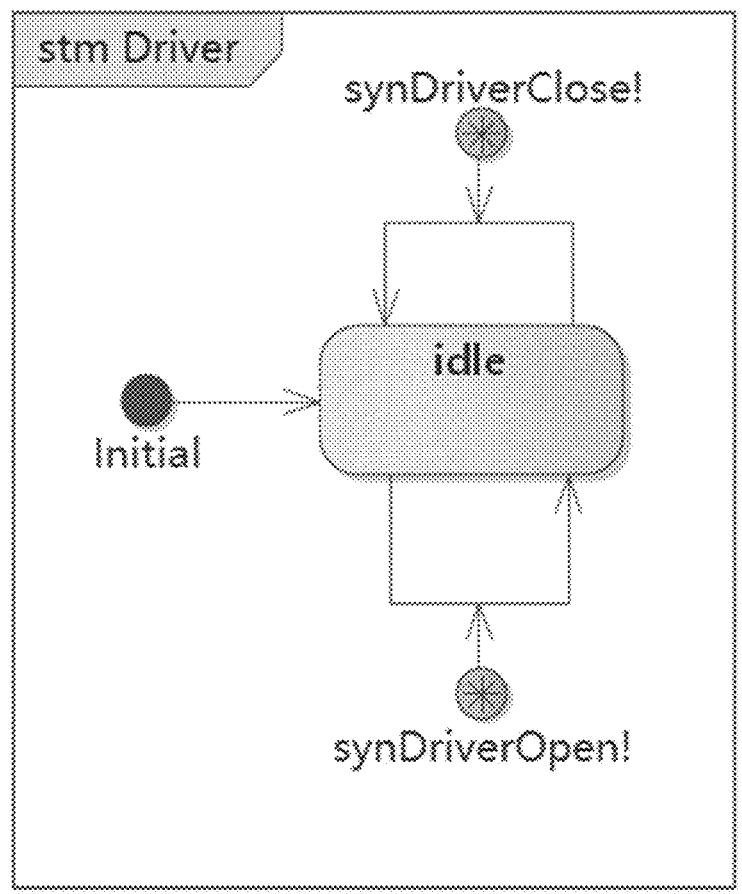
FIG. 3 shows a diagram of the driver state machine in the embodiment of train door control.

The driver state machine diagram is shown in FIG. 3. There is one idle State and two Transitions, the Initial element points to the idle State, and the two Transitions are pointed by Synch elements since they are all synchronous migrations, where synDriverClose indicates that the driver sends a closing command to the train door controller, and synDriverOpen indicates that the driver sends an open command to the train door controller.

Figure 4:
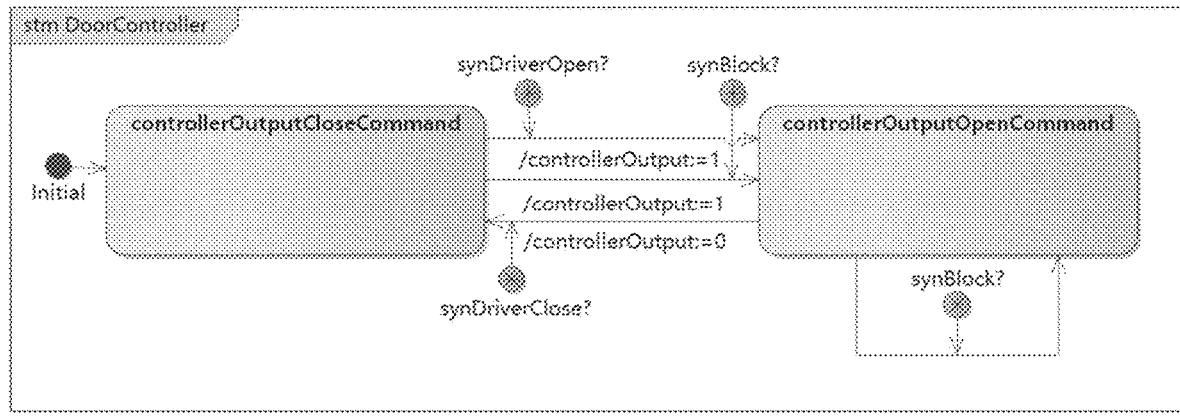
FIG. 4 shows a diagram of the train door controller state machine in the embodiment of train door control.

The train door controller state machine diagram is shown in FIG. 4. The train door controller receives open command and close command from the driver and issues open command and close command to the train door, and issues open command when a block appears in the doorway. The specific element types are similar to the driver state machine diagram.

Figure 5:
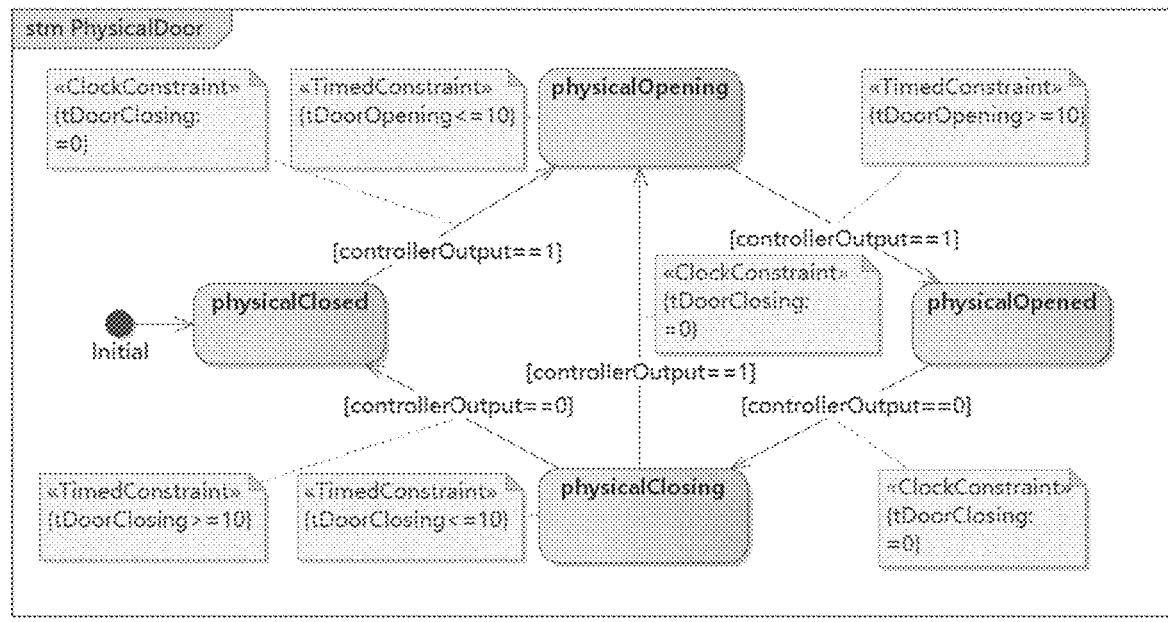
FIG. 5 shows the train door state machine in the embodiment of train door control.

The train door state machine diagram is shown in FIG. 5. The train door contains four states: fully closed, opening process, fully opened and closing process. Since the train door opening process and closing process take time, the related time information needs to be described. Here, the implementation uses the MARTE element for the description. Taking the physicalOpening State as an example, the ClockConstraint element pointing to the move-in transfer indicates that the tDoorOpening clock variable is updated to start the timing; the TimedConstraint element pointing to the State indicates the time that needs to be satisfied in the physicalOpening state, i.e., tDoorOpening<=10; the TimedConstraint element pointing to MoveOut transfer indicates the time constraint to be satisfied when the migration occurs, i.e., tDoorOpening>=10; the combination of the above three MARTE elements indicates that the door opening time is 10 time units. The closing process also takes 10-time units. Of course, the time units can be adjusted according to the specific scenario.

Figure 6:
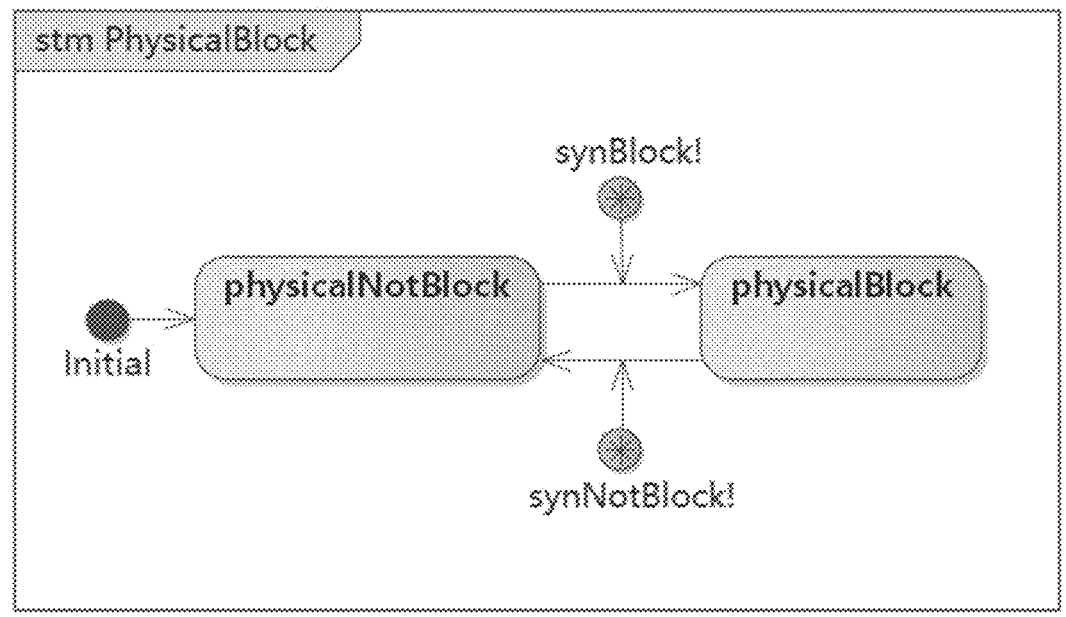
FIG. 6 shows a diagram of the block state machine in the embodiment of train door control.

The block state machine diagram is shown in FIG. 6. The driver can observe the presence or absence of block in the doorway.

Step 3: To identify Unsafe Control Actions

1. Define an unsafe control action (UCA) as {CA-PR, Type, Context}, which is a combination between a control action (CA-PR), the type of the UCA, and the context, and that this combination can lead to some system-level hazard. The hazard may be a system-level hazard already identified in the first step, or it may be a new hazard that is about to be identified through the current third step.

The train door controller provides control actions comprising Open Command, Close Command. Since the system state machine does not include the actuator at this time, the CA is the same as the CA-PR.

CA-PR can take the values of Open Command or Close Command.

The types of UCA include: Type1: Not providing the control action leads to a hazard; Type2: Providing the control action leads to a hazard; Type3: Providing a control action too early, too late, or in the wrong order; Type4: The control action lasts too long or is stopped too soon (for continuous control actions, not discrete control actions). Therefore, the available values of Type are Type 1, Type 2, Type 3, Type 4.

2. Determine the context variable CVari of Context and its possible values according to the SysML system state machine and list all instances of Context.

The context variables are PhysicalDoor, the state of the train door, and PhysicalBlock, the state of the block. Context={PhysicalDoor, PhysicalBlock}.

PhysicalDoor can take the values of 1:Closing, 2:Opening, 3:Closed, and 4:Opened.

PhysicalBlock can take the values of 1:NotBlocked, 2:Blocked.

Therefore, the Context can take the values of (1,1), (1,2), (2,1), (2,2), (3,1), (3,2), (4,1), (4,2).

3. By traversal, all instances of {CA-PR, Type, Context} are given. Each instance of {CA-PR, Type, Context} is considered as a Potential UCA (PUCA). A PUCA containing a time-independent "Type" is called a time-independent PUCA, and a PUCA containing a time-dependent "Type" is called a time-dependent PUCA.

Potential UCA={CA-PR, Context, Type}, there are 64 cases. As an example, only a few cases are listed in this invention, please see the following table.

TABLE 2

| CA-PR | Type | Context | | ID |
|---|---|---|---|---|
| | | PhysicalDoor | PhysicalBlock | |
| Close Command | Providing | Opened | Blocked | 1 |
| | | | Not Blocked | 2 |
| | | Closed | Blocked | 3 |
| | | | Not Blocked | 4 |
| | | Opening | Blocked | 5 |
| | | | Not Blocked | 6 |
| | | Closing | Blocked | 7 |
| | | | Not Blocked | 8 |
| | Not providing | ... | ... | ... |
| | Too early, too late, out of order | ... | ... | ... |
| | Stopped too soon, applied too long | ... | ... | ... |
| Open Command | Providing | ... | ... | ... |
| | Not providing | ... | ... | ... |
| | Too early, too late, out of order | Opened | Blocked | 49 |
| | | | Not Blocked | 50 |
| | | Closed | Blocked | 51 |
| | | | Not Blocked | 52 |
| | | Opening | Blocked | 53 |
| | | | Not Blocked | 54 |
| | | Closing | Blocked | 55 |
| | | | Not Blocked | 56 |
| | Stopped too too long soon, applied | ... | ... | ... |
| | | | | 64 |

4. Analyze each PUCA one by one to determine whether it is a UCA according to the loss determined in the first step.

The above 64 cases were analyzed one by one, and the results were summarized in the following table.

TABLE 3

| ID | Hazard | Description |
|---|---|---|
| 1 | H1 | The first step has marked the hazard |
| 2 | None | ... |
| ... | ... | ... |
| 55 | H2 | New hazard |
| 56 | None | ... |
| ... | ... | ... |
| 64 | ... | ... |

The following is an example of the analysis process using PUCAs with IDs 1 and 55.

The PUCA with ID 1, that is, when the train door controller is fully open (PhysicalDoor=Opened) and the block is located in the doorway (PhysicalBlock=Blocked), the train door has received (Type=Providing) a door close command, which is Hazard H1 that has been identified in the first step, so fill in the Hazard column in the table above with H1.

The PUCA with an ID 55, that is, where the train door controller receives the open command (CA-PR=Open Command) too late (Type=Too early, too late, out of order) when the train door is in the closing process (PhysicalDoor=Closing) and the block is in the doorway (PhysicalBlock=Blocked), a hazard will appear in the system (the hazard will cause loss) and it is a new hazard that does not appear in the identified hazards. The present invention labels this as H2. In addition, the meaning of "too late" is determined to be later than 2-time units according to the design requirements of the system.

At this point, the identified hazards were updated to two, H1 and H2.

H1: The door receives a close command when the door is in the fully open state and there is a block in the doorway.

H2: When the door is in the closing process and there is a block in the doorway, the door receives the open command later than 2-time units.

The system-level hazard H can take the values of H1, H2.

Step 4: To identify loss scenarios

1. Update the system state machine, the updated system state machine includes the controller state machine, the controlled process state machine, the sensor state machine, the actuator state machine, and the interactions among them, as well as the state machines of the internal components of the controller, the controlled process, the sensor, and the actuator, and the interactions among the subcomponents.

The updated global variables of the system state machine are shown in the following table.

TABLE 4

| Variable Name | Variable Type | Range of values | Initial Value | Description |
| --- | --- | --- | --- | --- |
| tDoorOpening | Clock | \ | \ | Record train door opening time |
| tDoorClosing; | Clock | \ | \ | Record train door closing time |
| actuatorOutput | int | {0, 1} | 0 | Indicates the control message sent by the actuator to the door, 0 means closing, 1 means opening |
| doorSensorOutput | int | {0, 3} | 0 | Indicates the train door status information sent by the train door sensor to the train door controller, 0 means closed, 1 means open process, 2 means open, 3 means closed process |
| blockSensorOutput | int | {0, 1} | 0 | Indicates the block status information sent by the block sensor to the train door controller, 0 indicates no block, 1 indicates an block |

Figure 7:
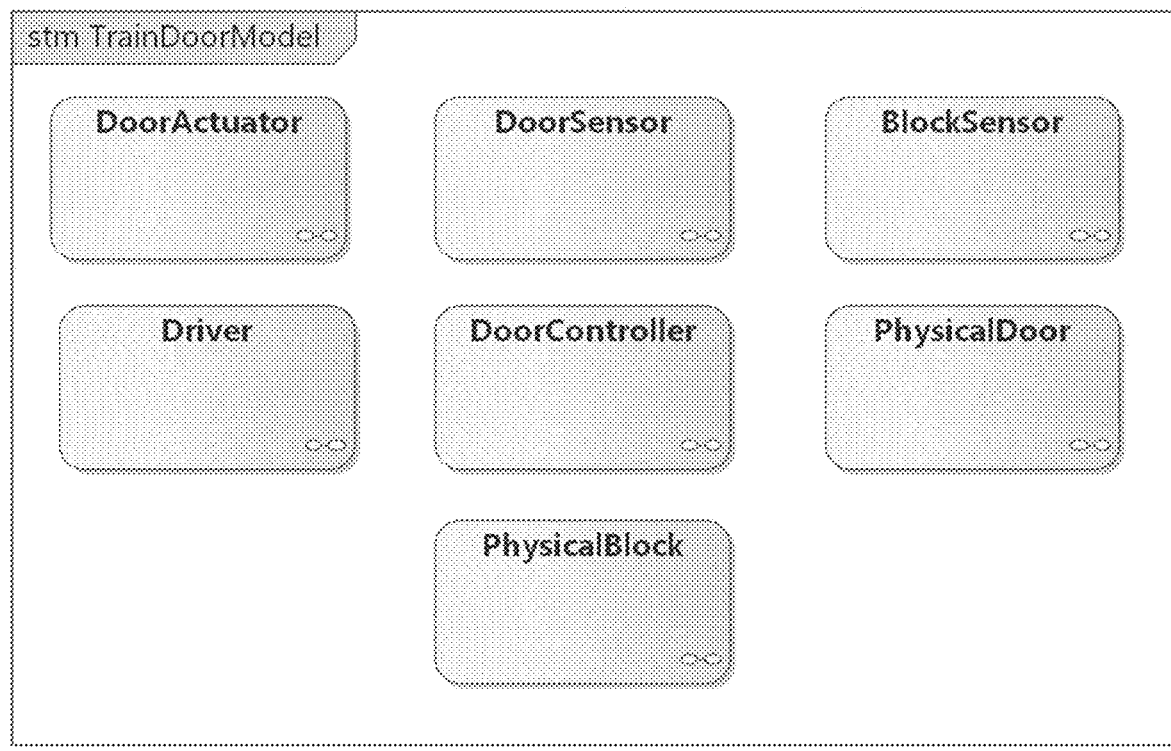
FIG. 7 shows a diagram of the system state machine after supplementing sensor and actuator in the embodiment of train door control.

The updated system state machine diagram is shown in FIG. 7.

The train driver and block state machine diagrams have not changed, so they are not shown repeatedly.

Figure 8:
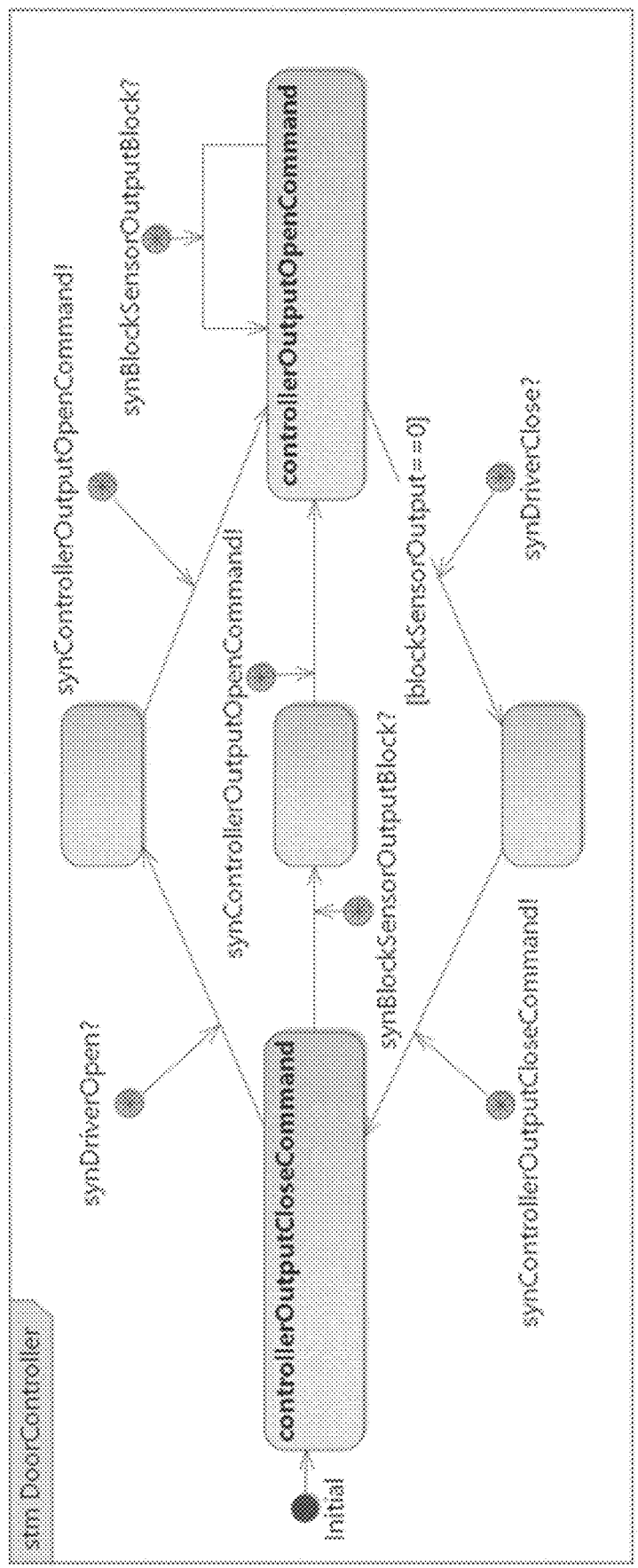
FIG. 8 shows a diagram of the train door controller state machine after supplementing sensor and actuator in the embodiment of train door control.

Due to the addition of the train door actuator, the state machine diagram of the train door controller has changed from sending control commands directly to the train door to sending open and close commands to the train door actuator. The changed state machine diagram is shown in FIG. 8.

Figure 9:
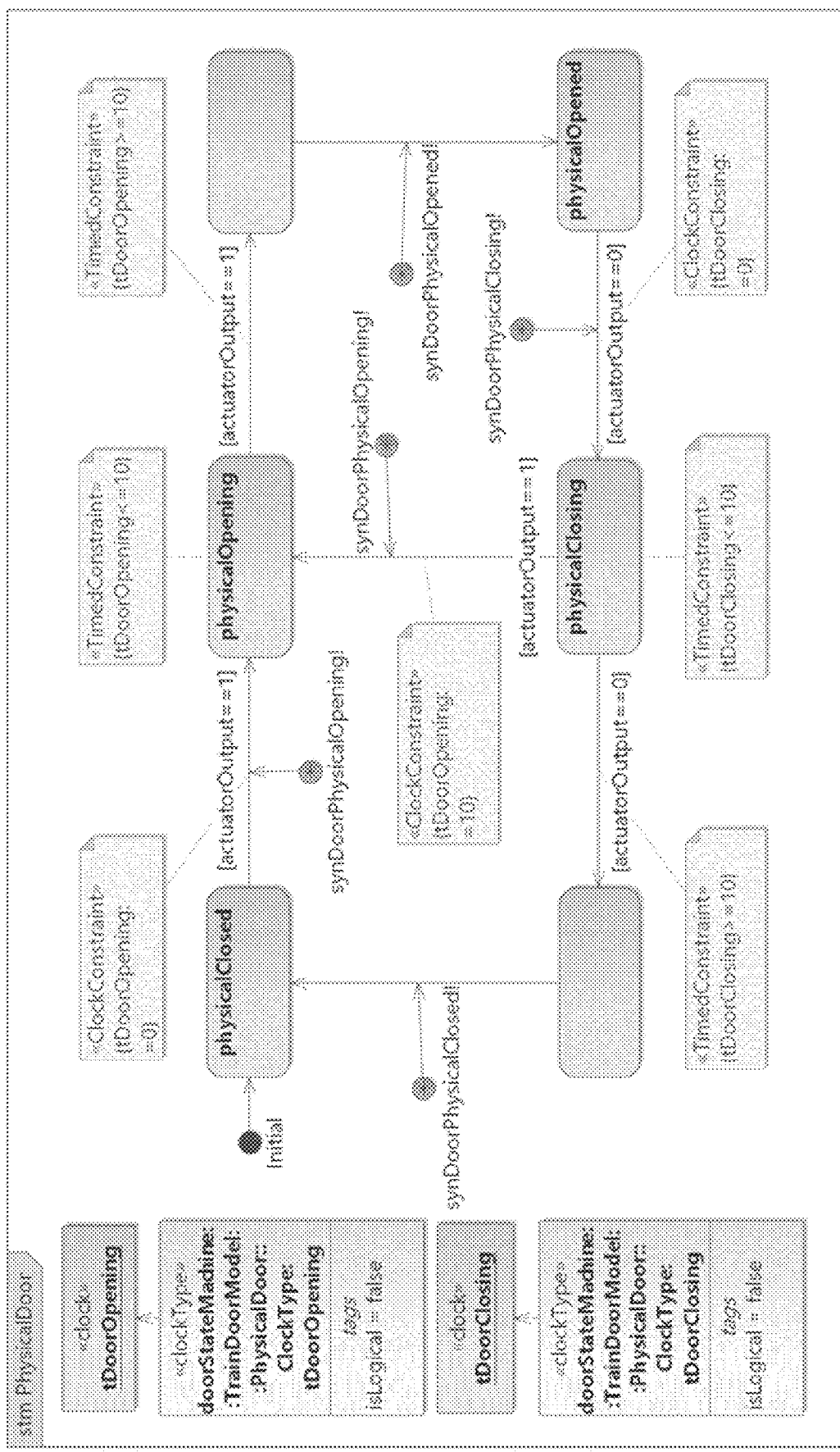
FIG. 9 shows a diagram of the train door state machine after supplementing sensor and actuator in the embodiment of train door control.

Due to the addition of the train door actuator and the train door sensor, the train door state machine diagram was also changed from receiving commands directly from the train door controller to receiving the signal output from the train door actuator, while the feedback signal was transmitted via the train door sensor. The changed state machine diagram of the train door is shown in FIG. 9.

Figure 10:
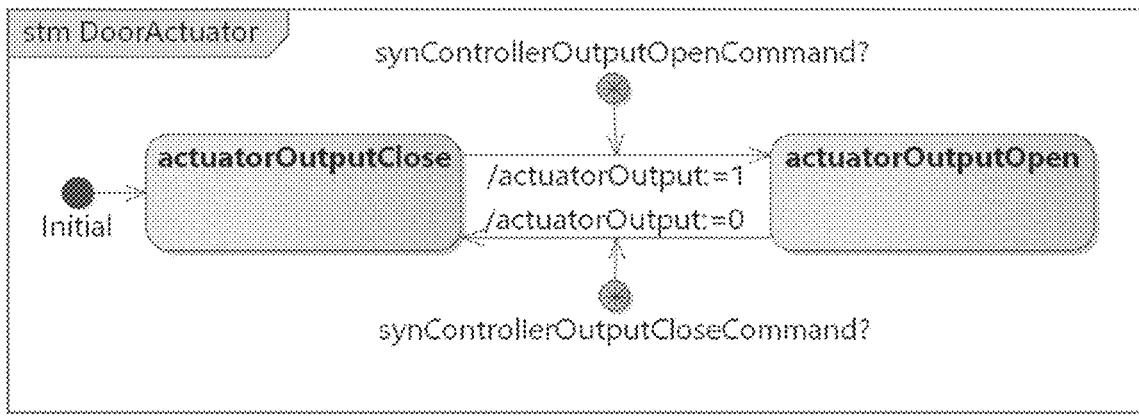
FIG. 10 shows a diagram of the train door actuator state machine in the embodiment of train door control.

The state machine diagram of the train door actuator is shown in FIG. 10, which is used to receive the closing command and opening command from the train door controller and output the closing signal and opening signal to the train door.

Figure 11:
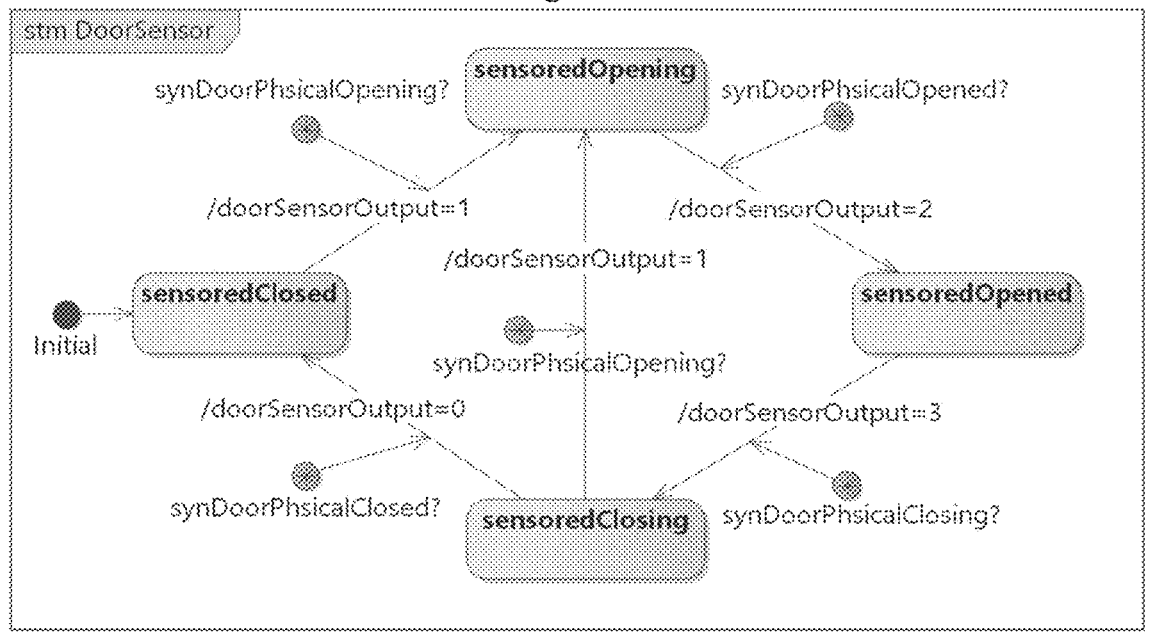
FIG. 11 shows a diagram of the train door sensor state machine in the embodiment of train door control.

The train door sensor state machine diagram is shown in FIG. 11, which is used to sense the state of the train door and send the corresponding train door state information to the train door controller.

Figure 12:
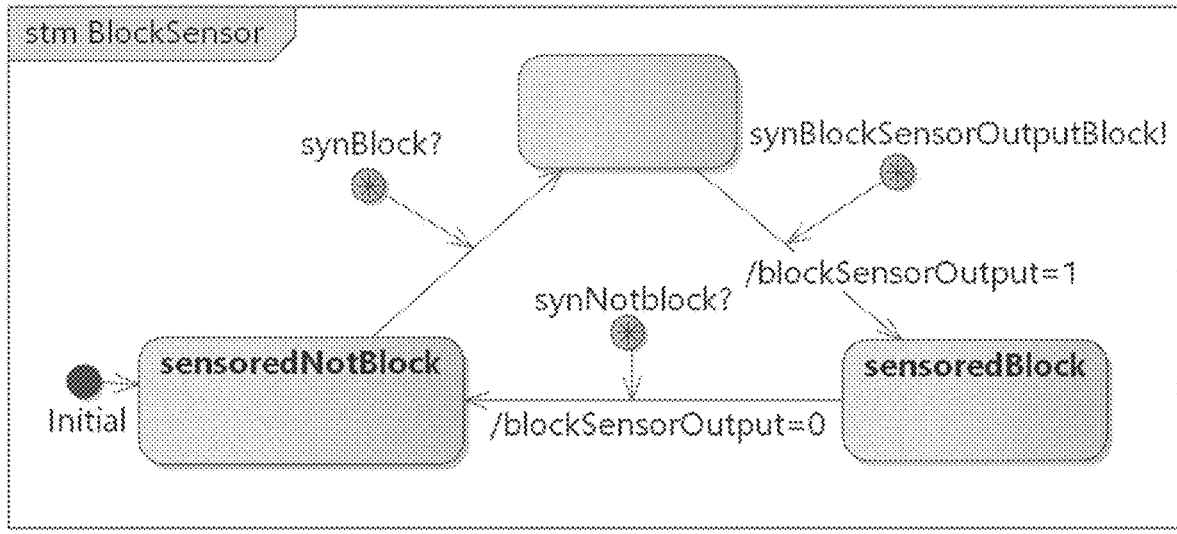
FIG. 12 shows a diagram of the block sensor state machine in the embodiment of train door control.

The block sensor state machine diagram is shown in FIG. 12, which is used to sense whether the block is in the doorway or not and send the corresponding information to the train door controller.

2. Model a model checking model based on the updated system state machine modeled in step 1

Please see the technical solution for the specific modeling process, only the modeling results are shown here.

Figure 13:
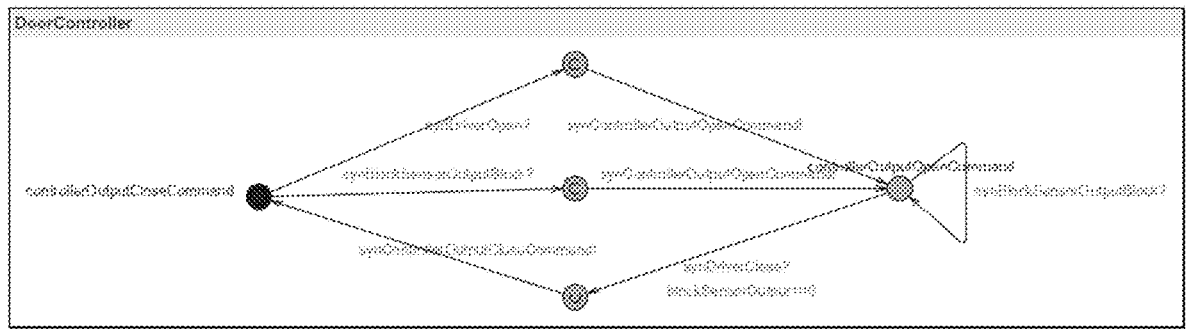
FIG. 13 shows the train door controller UPPAAL Template in the embodiment of train door control.

The train door controller UPPAAL Template is shown in FIG. 13.

Figure 14:
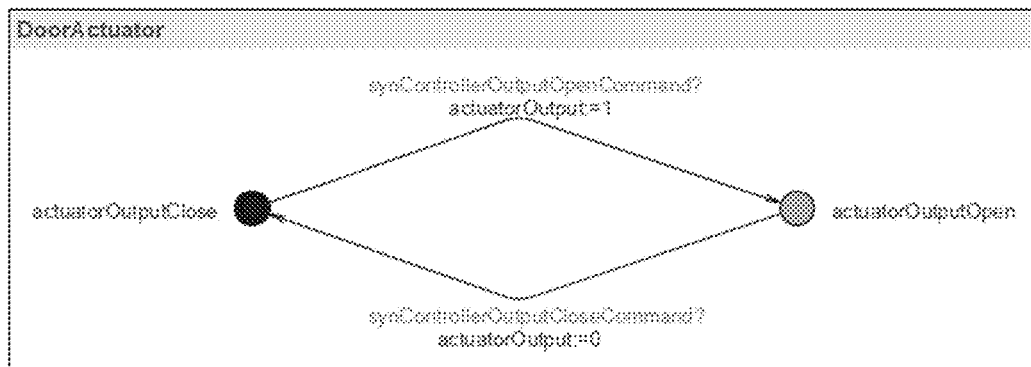
FIG. 14 shows the train door actuator UPPAAL Template in the embodiment of train door control.

The train door actuator UPPAAL Template is shown in FIG. 14.

Figure 15:
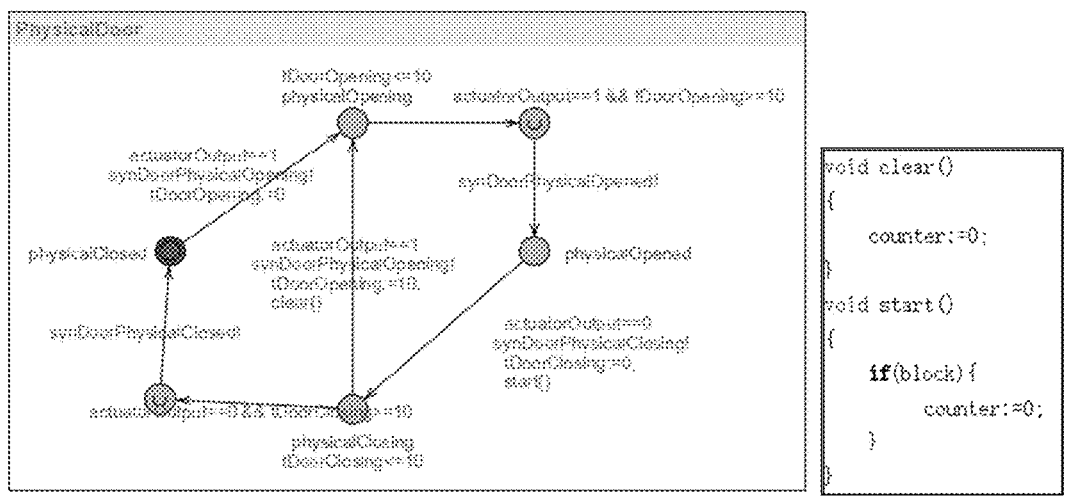
FIG. 15 shows the train door UPPAAL Template and its functions in the embodiment of train door control.

Train door UPPAAL Template is shown in FIG. 15, where clear( ) and start( ) functions to clear and start the clock variable counter respectively; block variable is a Boolean value, true means that the block is located in the doorway, false means that the block is not located in the doorway; counter is to record the time between the appearance of the block and the train door counter is a clock variable defined to record the time of the process from the appearance of the block to the train door turning to the open state; there are no variables and functions in the SysML system state machine that express information such as counter, clear( ) start( ) etc., so the above variables and functions are added to the UPPAAL Template in order to verify the safety constraints.

Figure 16:
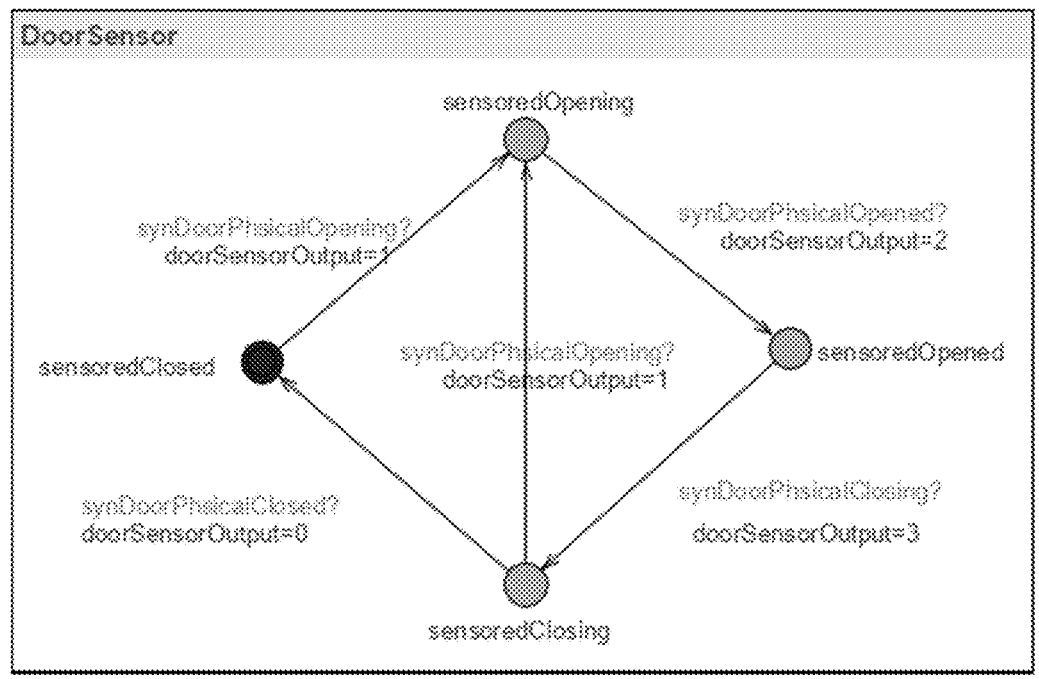
FIG. 16 shows the train door sensor UPPAAL Template in the embodiment of train door control.

The train door sensor UPPAAL Template is shown in FIG. 16.

Figure 17:
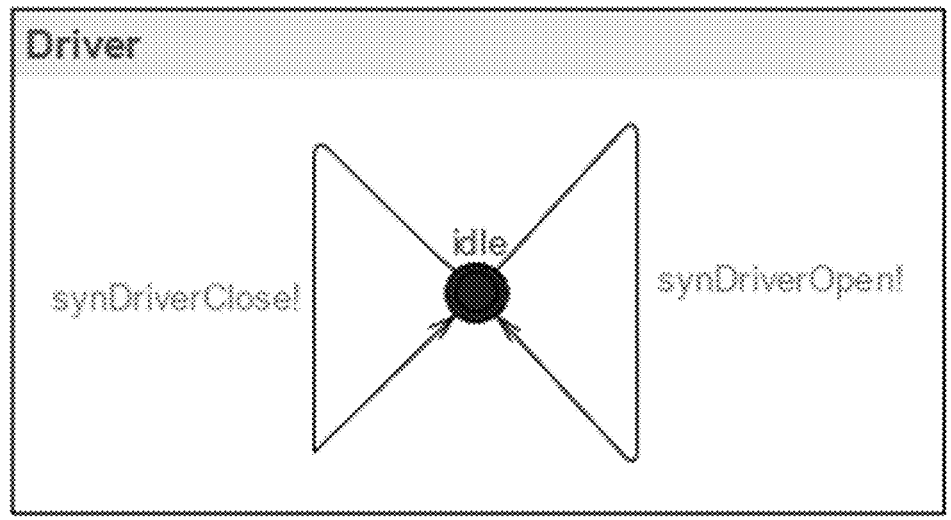
FIG. 17 shows the driver UPPAAL Template in the embodiment of train door control.

The train driver UPPAAL Template is shown in FIG. 17.

Figure 18:
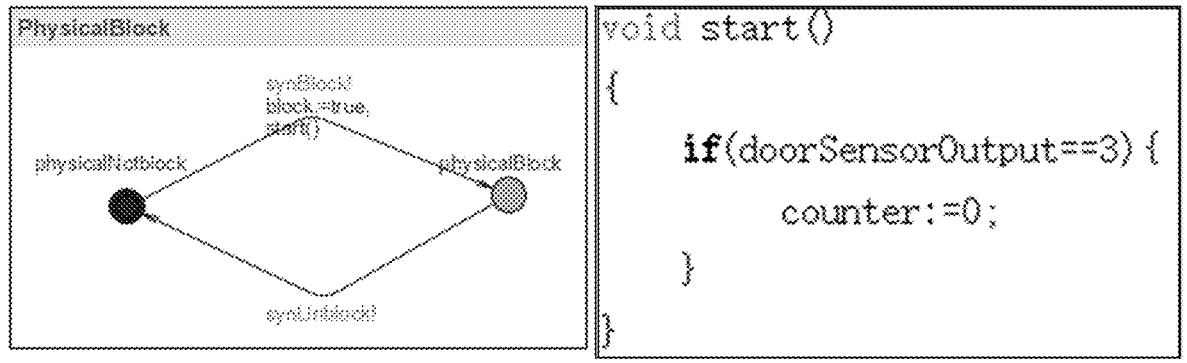
FIG. 18 shows the block UPPAAL Template and its functions in the embodiment of train door control.

The block UPPAAL Template is shown in FIG. 18, where the start( ) function is introduced to verify the safety constraint and the start( ) function is used to start the clock variable "counter".

Figure 19:
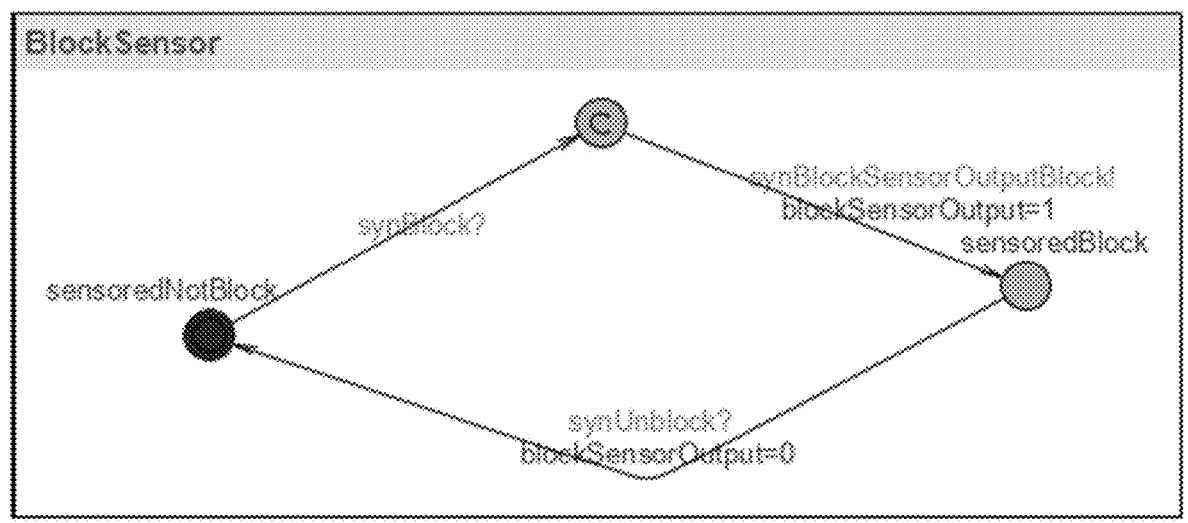
FIG. 19 shows the block sensor UPPAAL Template in the embodiment of train door control.

The block sensor UPPAAL Template is shown in FIG. 19.

3. Determine the safety constraints of the system according to the system-level hazards, and describe the safety constraints using the logic language supported by model checking technology to form the properties to be checked; after this step, each system-level hazard corresponds to a safety constraint of the system, and each safety constraint of the system corresponds to a property to be checked Based on the system-level hazards H1 and H2 identified in the third step, the safety constraints of the system (abbreviated as SC, with subscripts indicating the corresponding system-level hazards) are determined as follows.

$SC_{H1}$: When the door is fully open and there is a block in the doorway, the door cannot receive a close command.

$SC_{H2}$: When the door is in the closing process and there is a block in the doorway, the door must receive the open command within 2-time units.

The safety constraint is then converted into a TCTL constraint, i.e., a property to be checked. SpecHx represents the TCTL expression specification of the safety constraint $SC_{HX}$ corresponding to hazard Hx.

$Spec_{H1}$:

A[ ] not (PhysicalDoor.physicalOpened and PhysicalBlock.physicalBlock and actuatorOutput==0)

$Spec_{H2}$:

A[ ] not (PhysicalDoor.physicalClosing and actuatorOutput==0 and counter>=2).

4. Use the model checking technique to analyze whether the model checking model modeled in step 2 satisfies the properties to be checked generated in step 3, and if it violates, the model checking technique gives a counterexample, which is a loss scenario leading to a system-level hazard; repeat this step until the UPPAAL model has completed model checking for all the properties to be checked.

Verify $Spec_{H1}$ Result: Pass.

A[ ] not (PhysicalDoor.physicalOpened and PhysicalBlock.physicalBlock and actuatorOutput=0)

meet the property

Verify $Spec_{H2}$ Result: Pass.

A[ ] not (PhysicalDoor.physicalClosing and PhysicalBlock.physicalBlock and counter>2)

meet the property

The verification results show that the updated system state machine model built in step 1 satisfies the above safety constraints.

5. Model the "updated system state machine with CF added", convert it into a model checking model, and check the properties to be checked In the updated system state machine created in step 1, there is no delay in the signal transformation and transmission of the block sensor and the train door actuator. Here, the updated system state machine model with CF added is modeled by changing the state machine state and migration, i.e. injecting 1 to 2 time units of signal transmission delay into the block sensor and train door actuator, respectively, for a total of two CFs.

The method for injecting signal delays into the block sensor state machine is as follows.

Define a new local clock variable tBlockSensorDelay as a local clock variable to express the delay time of the block sensor, add an intermediate state (top left state in FIG. 20), add a "ClockConstraint" element to the "Effect" attribute of the Transition element that moves into this state, and set tBlockSensorDelay to zero, and add a "TimedConstraint" element (tBlockSensorDelay<=2) to the "Invariant" constraint attribute of the intermediate state, add a "TimedConstraint" element (tBlockSensorDelay>=1) to the "Guard" attribute of the Transition element that moves out from this state. Through the above elements, the delay of the block sensor from receiving the synBlock signal to sending the synBlockSensorOutputBlock signal is 1-2-time units.

Figure 20:
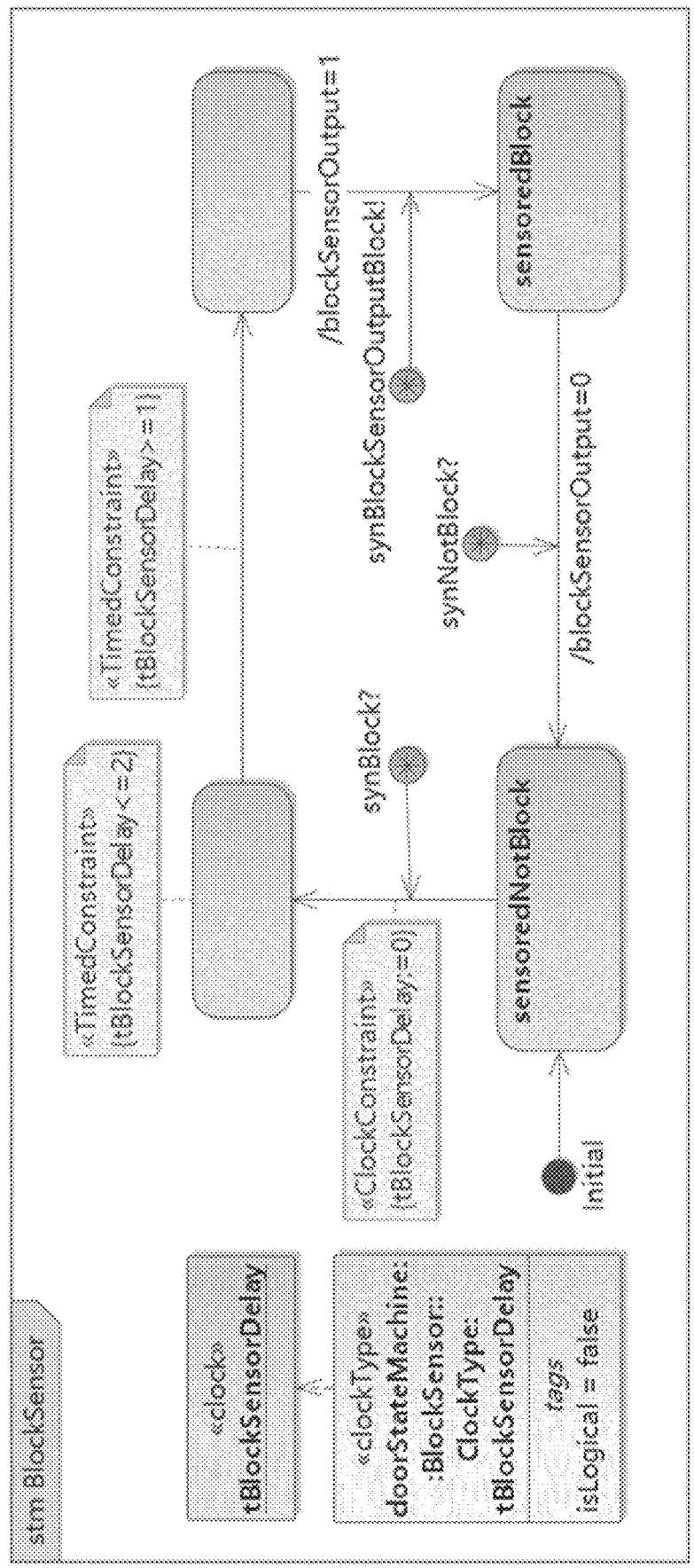
FIG. 20 shows a diagram of the block sensor state machine after injecting delay in the embodiment of train door control.

The state machine diagram of the block sensor after the injection delay is shown in FIG. 20.

The method of injecting signal delays into the train door actuator state machine is as follows.

Define a new local clock variable tActuatorDelay to express the delay time of the train door actuator, add an intermediate state (upper state in FIG. 21), add a "ClockConstraint" element to the "Effect" attribute of the Transition element that moves into this state, and set tActuatorDelay to zero, and add a "TimedConstraint" element (tActuatorDelay<=2) to the "Invariant" constraint attribute of the intermediate state, add a "TimedConstraint" element (tActuatorDelay>=1) to the "Guard" attribute of the Transition element that moves out from this state. Through the above elements, the delay of the train door controller from receiving the synControllerOutputCommand signal to outputting the door opening signal (actuatorOutput=1) is 1-2 time units.

Figure 21:
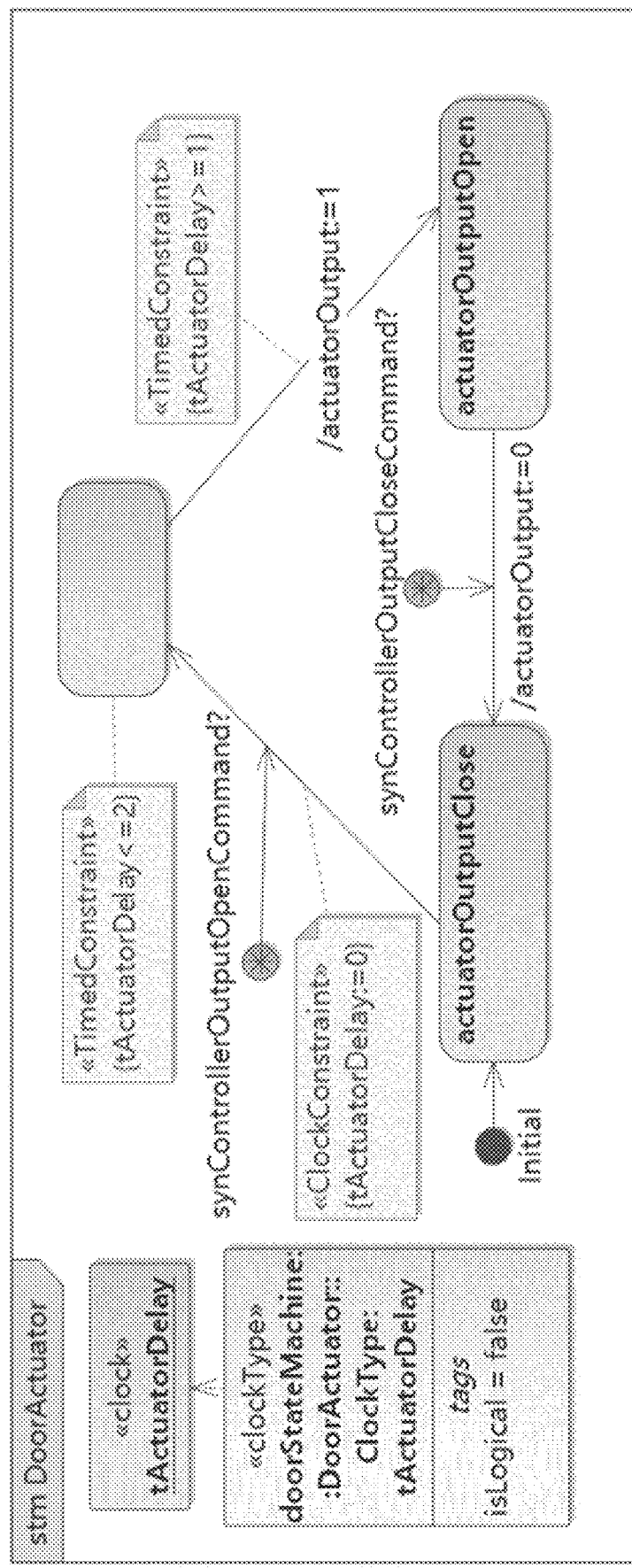
FIG. 21 shows a diagram of the train door actuator state machine after injecting delay in the embodiment of train door control.

The state machine diagram of the train door actuator after the injection delay is shown in FIG. 21.

The model checking model is modeled using the "SysML System State Machine with CF". Since the other state machines remain unchanged, only the UPPAAL model corresponding to the block sensor and train door actuator injected with CF is shown here.

Figure 22:
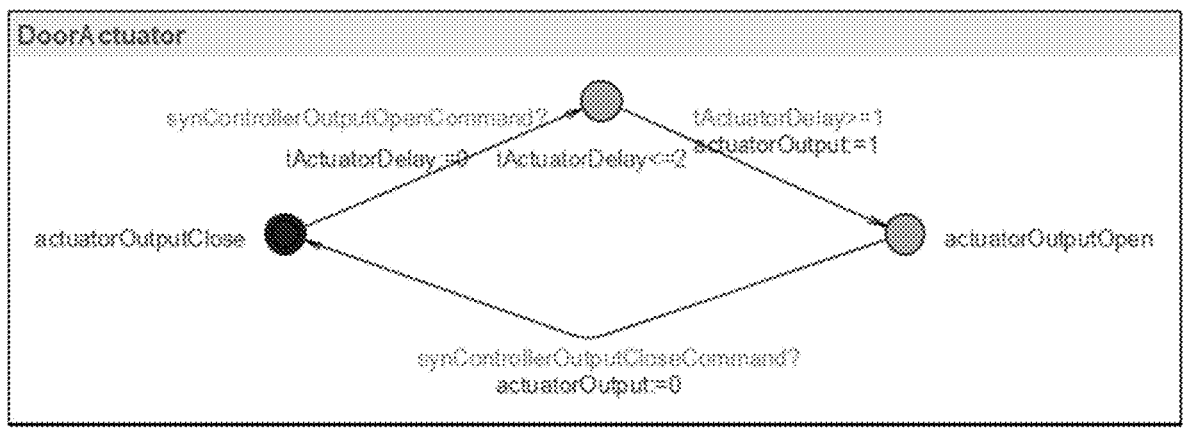
FIG. 22 shows the train door actuator UPPAAL Template after injecting delay in the embodiment of train door control.

The train door actuator UPPAAL Template after injection delay is shown in FIG. 22.

Figure 23:
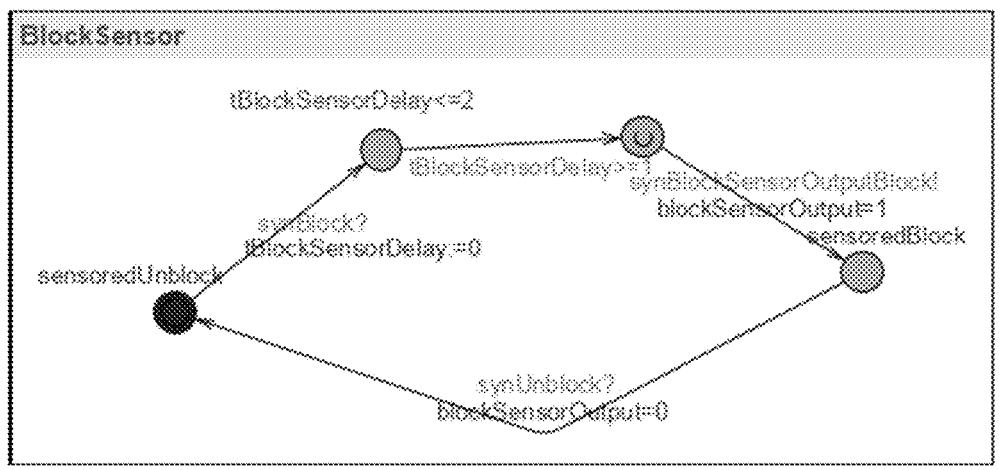
FIG. 23 shows the UPPAAL Template of the block sensor after injecting delay in the embodiment of train door control.

The UPPAAL Template of the block sensor after injection delay is shown in FIG. 23.

Validation of the UPPAAL model with CF injected.

$Spec_{H1}$ Validation result: failed.

A[ ] not (PhysicalDoor.physicalOpened and PhysicalBlock.physicalBlock and actuatorOutput==0)
Not meet the property $Spec_{H1}$ counterexample path (loss scenario 1):

①. The train operator issues an open command (synDriverOpen).

②. The train door controller receives the command and sends an open command (synControllerOutputOpenCommand) to the train door actuator.

③. After the train door actuator receives the open command, it delays 1-2 time units and outputs the open signal to the train door (actuatorOutput=1).

④. The train door then changes from a physicalClosed state to a physicalOpening state, while the train door sensor also changes to a sensoredOpening state.

⑤. After 10-time units, the train door becomes fully opened (physicallyOpened) and the train door sensor becomes sensored fully opened (sensoredOpened).

⑥. Then the driver issues the command to close the door (synDriverClose).

⑦. The train door controller sends a close command (synControllerOutputCloseCommand) to the train door actuator.

⑧. The train door actuator outputs the closing signal (actuatorOutput=0).

⑨. A block appears in the doorway, the doorway is in a state where a block exists (physicalBlock), and the train door sensor (tBlockSensorDelay) appears with a delay of 1-2-time units.

At this time, the doorway is in the presence of a block (physicalBlock), the train door is fully open (physicalOpened) and the train door actuator outputs a closing signal (actuatorOutput=0), the $Spec_{H1}$ safety constraint is violated, and the system is in a hazardous state of violation.

Figure 24:
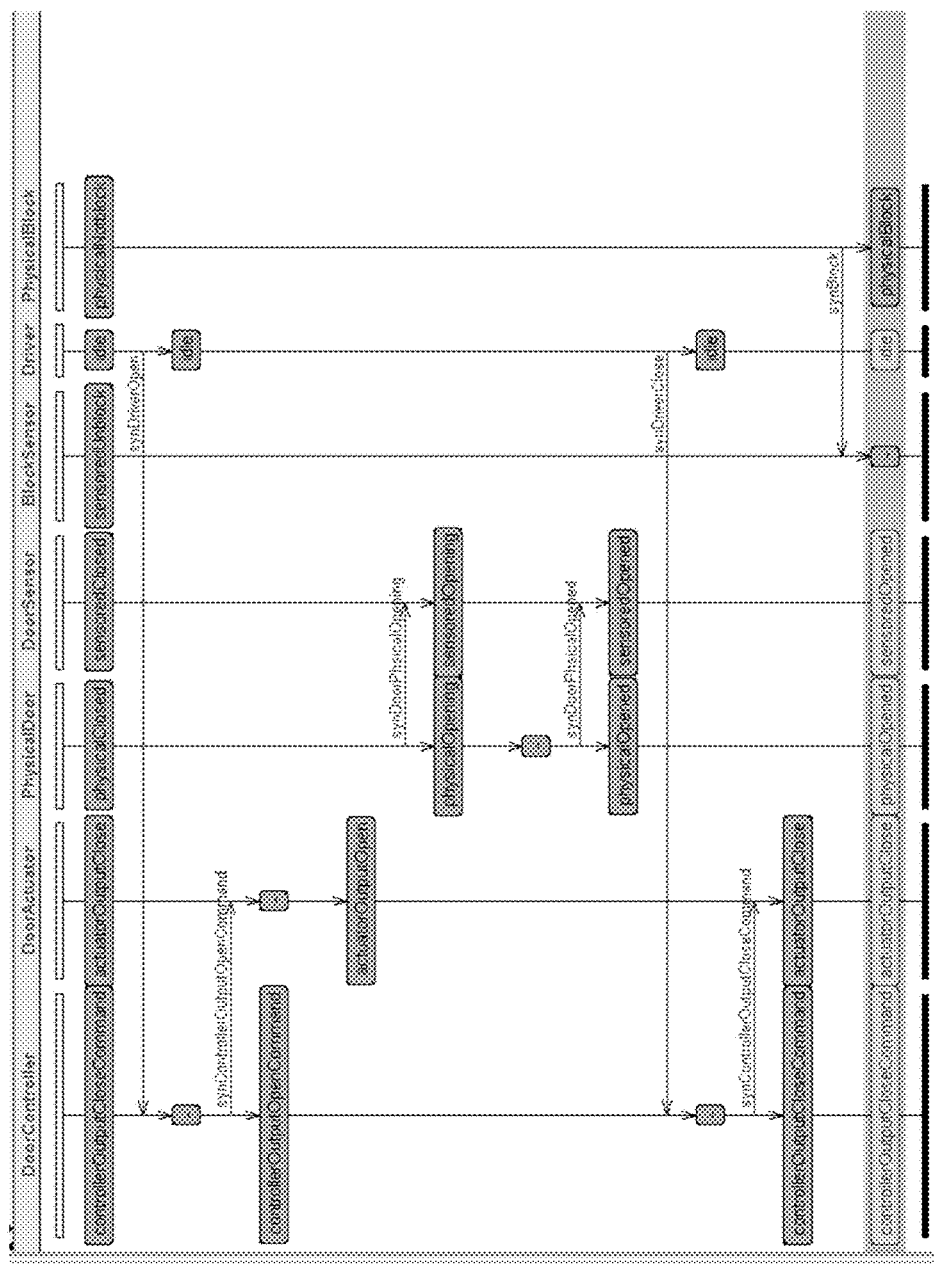
FIG. 24 shows the path diagram of the $Spec_{H1}$ counter-example in the embodiment of train door control.

As shown in FIG. 24, the final variable values are taken on the left and the counterexample sequential diagram is shown on the right.

$Spec_{H2}$ Validation result: failed.

---

A[ ] not (PhysicalDoor.physicalClosing and
PhysicalBlock.physicalBlock and counter>2)
Not meet the property

---

$Spec_{H2}$ counterexample path (loss scenario 2).

①. The train driver issues an open command (synDriverOpen).

②. The train door controller receives the command and sends an open command (synControllerOutputOpenCommand) to the train door actuator.

③. The train door actuator actuator receives the open command, delays 1-2-time units, and outputs the open signal to the train door (actuatorOutput=1).

④. The train door then changes from a physicalClosed state to a physicalOpening state, while the train door sensor also changes to a sensoredOpening state.

⑤. After 10-time units, the train door becomes fully opened (physicallyOpened) and the train door sensor becomes sensed fully opened (sensoredOpened).

⑥. Then the driver issues the command to close the door (synDriverClose).

⑦. The train door controller sends a close command (synControllerOutputCloseCommand) to the train door actuator.

⑧. The train door actuator outputs the closing signal (actuatorOutput=0).

⑨. The train door then changes from the fully opened state (physicallyOpened) to the closing process state (physicallyClosing), while the train door sensor also changes to the sensoredClosing process state.

⑩. The presence of a block in the doorway, the doorway is in the state of the presence of a block (PhysicalBlock), the block sensor receives the synBlock signal, at which point the counter is set to zero by the start( ) function and the timing begins.

⑪. Since there is a delay of 1-2-time units in the process of sending the synBlockSensorOutputBlock signal from the block sensor to the train door controller, the counter records 1-2-time units at this moment.

⑫. The train door controller issues an open command (synControllerOutputOpenCommand).

⑬. Since there is a delay of 1-2-time units in the process of outputting the door opening signal from the train door actuator, the counter records 2-4-time units at this moment, indicating that 2-4 time units have elapsed from the presence of a block in the doorway to the receipt of the door opening command by the train door.

The train door is in the closing process state (physicalClosing), the doorway is in the state of the presence of block (physicalBlock), the time elapsed from the presence of block in the doorway to the train door receiving the open command (counter) is greater than 2-time units, $Spec_{H2}$ is violated, the system is in a hazardous state.

This loss scenario contains two CFs, related to signal transmission delays and injected into the block sensor and the train door actuator, which act together to cause hazard in the interactive operation of the system.

Figure 25:
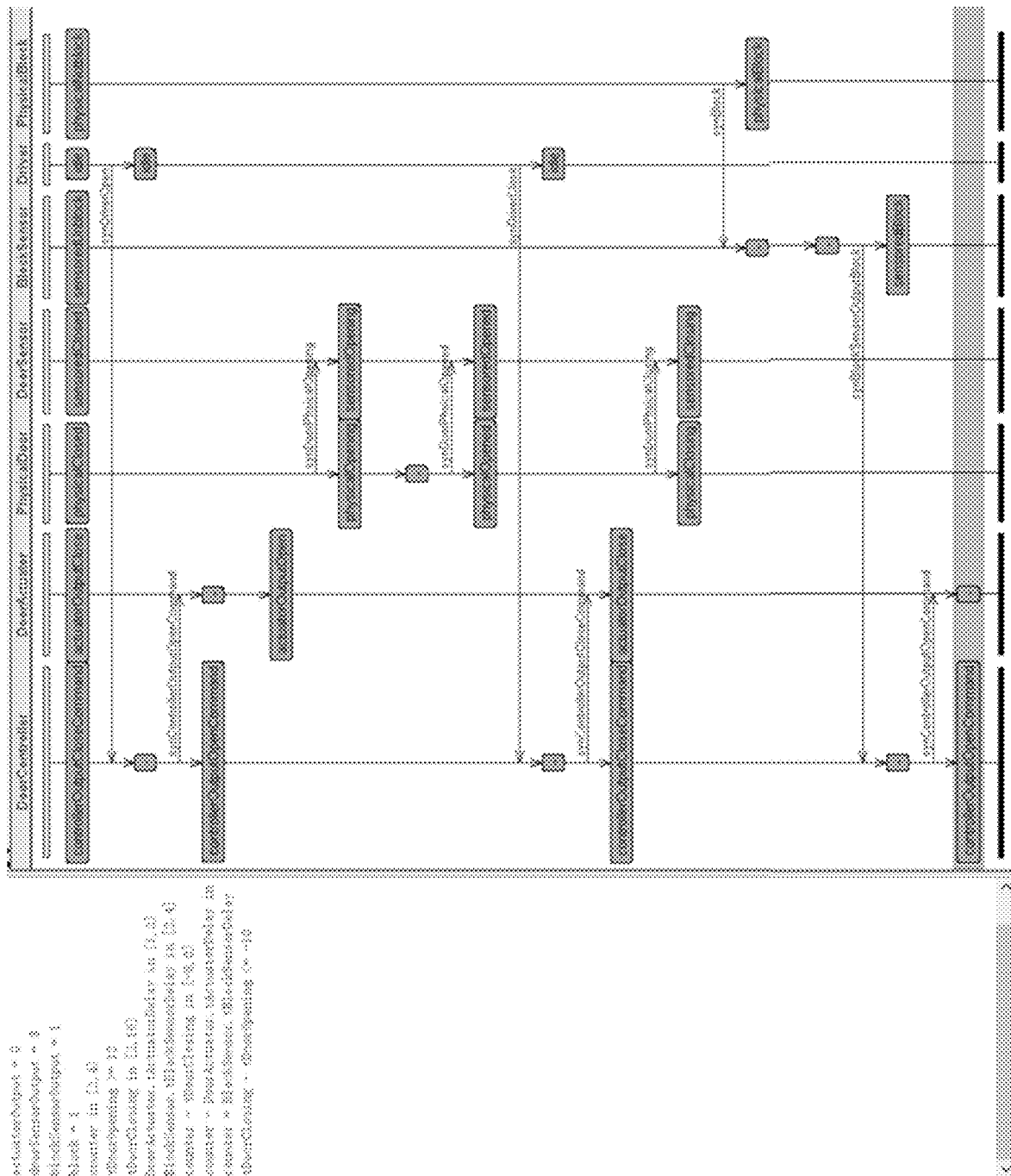
FIG. 25 shows the path diagram of the $Spec_{H2}$ counter-example in the embodiment of train door control.

As shown in FIG. 25, the left side is the final variable value, and the right side is the sequential diagram of the counter-example.

Compared with existing STPA methods, an STPA method of the present invention that accurately identifies a loss scenario has the following advantages:

1. Adopt state machines to build system control structure.

1) State machine is a common modeling technique in industry and is easy to use.

2) The use of languages such as SysML, AADL, and AltaRica to model system state machines helps integrate STPA analysis work with existing systems engineering work, and facilitates the use of existing systems engineering results, reducing the time required for STPA modeling, as well as reducing the semantic changes brought about by refactoring the model, which affects the quality of the analysis.

3) State machines can describe not only the input and output information between components, but also the system behaviour, which can provide a model basis for identifying hazardous scenarios in dynamic behaviour.

4) Complex system state machines can be modeled through the state machine nesting mechanism to meet the need for hierarchical modeling of the system control structure. The state machine can describe not only the high-level behavior of the system, but also the detailed behavior within the components. Therefore, the state machine can describe the intact behavior information of the system, and the controller, controlled process, sensors, and actuators can all be described using the state machine.

5) Model checking techniques allow for formal analysis of state machines. Using the state machine to build a model of the control structure of the system helps to convert this model into a model checking model, thus taking advantage of the model checking technique.

2. Automatic identification of loss scenarios using model checking techniques.

1) Automatic identification of loss scenarios is possible. It can automatically identify not only the occurrence scenarios of time-independent UCA/time-independent hazards, but also the occurrence scenarios of time-independent UCA/time-independent hazards.

2) Since model checking is a formal proof technique, if a system model is shown to satisfy a safety constraint by model checking, then that system model will satisfy that safety constraint in any scenario. It is difficult to draw such a conclusion by manual analysis.

3) Loss scenarios can be automatically identified in complex system component interaction behaviors.

4) Using interaction behaviors and internals behaviors of the controller, controlled process, actuator, sensor as a whole for model checking, it can find more loss scenarios of the hazards from the system emergence, which is difficult to be found. This is not achieved by existing STPA methods.

The above mentioned is only a preferred embodiment of the invention and is not used to limit the invention. Any modification, equivalent replacement, improvement, etc.

made within the spirit and principles of the invention shall be included in the scope of protection of the invention.

What is claimed is:

1. A System-Theoretic Process Analysis (STPA) method for automatically identifying a loss scenario in a system composed of hardware and/or software components, the method being implemented by a processor and comprising:
    defining a purpose of analysis, comprising identifying a loss associated with the system;
    modeling a system state machine using a finite state machine, the modeling being performed (i) with or without incorporating additional causal factors, and (ii) with or without modeling any faulty component;
    identifying an unsafe control action using the loss associated with the system and the modeled system state machine, wherein identifying an unsafe control action using the loss associated with the system and the modeled system state machine comprises:
        generating a Potential Unsafe Control Action (PUCA), said PUCA comprising:
            a control action received by the controlled process;
            a type; and
            a context, wherein the type comprises:
                a time-independent type, which comprises not providing a control action or providing a control action; or
                a time-dependent type, which comprises providing a control action too early, too late, in a wrong order, lasting too long, or ending too quickly;
        determining whether the PUCA is the unsafe control action based on the loss associated with the system and the generated PUCA, wherein the unsafe control action constitutes a system-level hazard, and wherein the unsafe control action having the time-independent type is referred to as a time-independent unsafe control action, and the unsafe control action having the time-dependent type is referred to as a time-dependent unsafe control action;
    identifying the loss scenario using a model checking technique and the identified unsafe control action, wherein the model checking is an automated verification technique that comprises a model to be checked, a property to be checked, and a model checking algorithm,
    and wherein identifying the loss scenario using the model checking technique and the identified unsafe control action comprises:
        forming, based on the unsafe control action, a property to be checked using a model checking logic language, wherein, if the unsafe control action is a time-dependent unsafe control action, it is described using time information in the system state machine;
        performing model checking on the model to be checked against the property to be checked, to automatically generate a trace that shows the model's evolution from its initial state to a state violating the property, wherein the trace represents the loss scenario, wherein the loss scenario comprises a process in which the system generates the system-level hazard.

2. The method according to claim 1, wherein the system state machine comprises a controller state machine, a controlled process state machine, and an interaction between the controller state machine and the controlled process state machine.

3. The method according to claim 2, wherein the system state machine comprises all behaviors of the controller, all behaviors of the controlled process, and all interactive behaviors between the controller and the controlled process, that are required for identifying the unsafe control action.

4. The method according to claim 1, wherein the finite state machine incorporates a state machine nesting mechanism to represent a hierarchical control structure.

5. The method according to claim 1, wherein identifying the loss scenario using model checking techniques and the identified unsafe control action comprises:
    updating the system state machine, the updated system state machine comprising a controller state machine, a controlled process state machine, a sensor state machine, an actuator state machine, and an interaction thereof;
    modeling a model checking model using the updated system state machine and identifying the loss scenario using the unsafe control action and the model checking model.

6. The method according to claim 5, wherein the updated system state machine comprises all behaviors of the controller, all behaviors of the controlled process, all behaviors of the sensor, all behaviors of the actuator, and all behaviors of the interaction of the controller, the controlled process, the sensor, and the actuator, that are required for identifying the loss scenario.

7. The method according to claim 5, wherein the system state machine is modeled using Systems Modeling Language (SysML), Architecture Analysis & Design Language (AADL) or AltaRica, and the model checking model is modeled using New Symbolic Model Verifier (NuSMV) or UPPAAL.

8. The method according to claim 1, wherein the time information in the system state machine is described by a Modeling and Analysis of Real-Time and Embedded systems (MARTE) element or a clock variable.

9. The method according to claim 1, wherein forming, based on the unsafe control action, a property to be checked using a model checking logic language comprises:
    determining a system safety constraint based on the unsafe control action;
    describing the system safety constraint using a model checking logic language to form a property to be checked.

10. The method according to claim 9, wherein the generating a PUCA comprises:
    determining the control action received by the controlled process and the context, using the system state machine, wherein the context comprises a state of the system;
    identifying an instance of a combination of the control action received by the controlled process, the context and the type as the PUCA.

11. The method according to claim 1, wherein the property to be checked is described using logic language Timed Computation Tree Logic (TCTL), Computation Tree Logic (CTL), Linear Temporal Logic (LTL), or Real-Time Computation Tree Logic (RTCTL).

12. A non-transitory computer readable storage medium comprising a computer program stored thereon, wherein the computer program implements the method of claim 1 when executed by a processor.

13. A computer device comprising a processor and a computer program, wherein the computer program implements the method of claim 1 when executed by the processor.

* * * * *